(12) United States Patent
Kouno

(10) Patent No.: US 9,794,430 B2
(45) Date of Patent: Oct. 17, 2017

(54) PRINTING SYSTEM, PRINT OUTPUT DEVICE, AND PROGRAM FOR GENERATING DISPLAY DATA OF DISPLAY SCREEN

(71) Applicant: Konica Minolta, Inc., Chiyoda-ku, Tokyo (JP)

(72) Inventor: Takahiro Kouno, Kawanishi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/969,728

(22) Filed: Dec. 15, 2015

(65) Prior Publication Data

US 2016/0173709 A1   Jun. 16, 2016

(30) Foreign Application Priority Data

Dec. 16, 2014   (JP) .................................. 2014-254321

(51) Int. Cl.
     *H04N 1/00*   (2006.01)
(52) U.S. Cl.
     CPC ....... *H04N 1/00244* (2013.01); *H04N 1/0044* (2013.01); *H04N 1/00217* (2013.01); *H04N 1/00307* (2013.01); *H04N 1/00411* (2013.01); *H04N 2201/0094* (2013.01)
(58) Field of Classification Search
     CPC .................................. H04N 1/00244
     USPC ........................................ 358/1.15
     See application file for complete search history.

(56) References Cited

U.S. PATENT DOCUMENTS

| 2007/0253026 | A1  | 11/2007 | Sakuda et al. |
| 2015/0092233 | A1* | 4/2015  | Park ...................... G06F 3/1288 358/1.15 |
| 2015/0146246 | A1* | 5/2015  | Ito ...................... H04N 1/32144 358/1.15 |
| 2015/0381827 | A1* | 12/2015 | Kambegawa ........ H04N 1/0023 358/1.15 |

FOREIGN PATENT DOCUMENTS

| JP | 2004-192162 A | 7/2004 |
| JP | 2006-106846 A | 4/2006 |
| JP | 2009-27500 A  | 2/2009 |
| JP | 2009-110381 A | 5/2009 |
| JP | 2013-3645 A   | 1/2013 |

OTHER PUBLICATIONS

Office Action (Notice of Reasons for Rejection) dated Mar. 14, 2017, by the Japanese Patent Office in corresponding Japanese Patent Application No. 2014-254321, and English translation of Office Action (13 pages).

* cited by examiner

*Primary Examiner* — Jacky X Zheng
(74) *Attorney, Agent, or Firm* — Buchanan Ingersoll & Rooney PC

(57) ABSTRACT

A printing system includes: a print output device arranged inside a predetermined LAN; a first server arranged outside the predetermined LAN; and an information terminal configured to transmit, to the first server, a print request indicating that a print output related to a designated file is to be performed in the print output device, wherein the first server transfers the print request to the print output device when receiving the print request from the information terminal, and the print output device generates display data of a print preview screen based on print setting included in the print request and transmits the display data to the information terminal.

8 Claims, 23 Drawing Sheets

PRINTER NAME — PRINTER_A
PRINT IN UNIT OF COPY — YES
COLOR — MONOCHROME
NUMBER OF COPIES — 1+
DUPLEX PRINTING — OFF
PAGE ORIENTATION — PORTRAIT

DETAIL OPTION
PAPER FEED TRAY — AUTOMATIC
KIND OF PAPER — PLAIN PAPER
LAYOUT — 4in1
PUNCH — TWO HOLE
STAPLE — UPPER LEFT

CANCEL

PRINT

241

PRINTING SYSTEM, PRINT OUTPUT DEVICE, AND PROGRAM FOR GENERATING DISPLAY DATA OF DISPLAY SCREEN

The entire disclosure of Japanese Patent Application No. 2014-254321 filed on Dec. 16, 2014 including description, claims, drawings, and abstract are incorporated herein by reference in its entirety.

BACKGROUND OF THE INVENTION

Field of the Invention

An embodiment of the present invention relates to a print output device such as a multi-functional peripheral (MFP) and a technology related thereto.

Description of the Related Art

Recently, a service to store an electronic document in a cloud server (cloud storage service) is provided.

Further, a service to perform a print output of an electronic document or the like, which is stored in the cloud server, by a print output device (such as MFP) arranged in a company to which a user belongs (in intranet) (cloud printing service) is also provided. For example, Google Cloud Print is an example (see, for example, Description of the Related Art in JP 2013-3645 A).

Incidentally, in a case of using the cloud print output service described above, a user displays a user interface screen prepared on a side of a cloud onto own used device (such as tablet terminal) and performs various kinds of operation by using the user interface screen.

For example, there is a user interface of a cloud print output service which interface displays a print preview screen. With visual recognition of such a print preview screen, a user can easily check whether a print setting is right.

However, such a print preview screen prepared on the side of the cloud only reflects setting contents related to a part of many print setting items (such as setting contents related to print setting item "color" ("full color" or "monochrome") and setting contents related to print setting item. "kind of print" ("one side" or "both side")). Thus, while a user can check whether setting contents related to the part of the print setting items are right, the user cannot check whether setting contents related to the other print setting item (such as setting contents "upper left" related to print setting item "stapled position") are right with the print preview screen.

As described, there is a problem that the user may not be able to acquire enough information as long as the user interface screen previously-prepared on the side of the cloud is used.

Note that such a condition may be caused not only with respect to transmission/reception of information related to the print preview screen but also with respect to transmission/reception of various different kinds of information.

As described, when a terminal used by a user can only acquire information unilaterally assigned from a cloud server, there is a problem that the user may feel inconvenience.

SUMMARY OF THE INVENTION

Thus, an object of an embodiment of the present invention is to provide a technology with which a terminal used by a user can flexibly acquire more various kinds of information in a print technology to perform a print output with utilization of a cloud server.

To achieve the abovementioned object, according to an aspect, a printing system reflecting one aspect of the present invention comprises: a print output device arranged inside a predetermined LAN; a first server arranged outside the predetermined LAN; and an information terminal configured to transmit, to the first server, a print request indicating that a print output related to a designated file is to be performed in the print output device, wherein the first server transfers the print request to the print output device when receiving the print request from the information terminal, and the print output device generates display data of a print preview screen based on print setting included in the print request and transmits the display data to the information terminal.

Item. 2 of the present invention is the printing system according to Item. 1, further preferably including a second server configured to store specification information to specify a source of transmission of the print request, wherein the information terminal preferably transmits the print request to the first server and preferably transmits identification information of the information terminal, which is the source of transmission of the print request, to the second server as the specification information.

Item. 3 of the present invention is the printing system according to Item. 2, wherein the print output device preferably transmits the display data of the print preview screen to the information terminal through the second server.

Item. 4 of the present invention is the printing system according to Item. 3, wherein the print output device preferably transmits the display data to the second server, and the second server preferably specifies the information terminal which is the source of transmission of the print request based on the specification information and preferably transmits the display data to the information terminal.

Item. 5 of the present invention is the printing system according to Item. 4, wherein the second server preferably establishes constant connection with the information terminal by a message session by a predetermined protocol and preferably transmits a request for receiving the display data to the information terminal from the second server by using the message session, and the information terminal preferably receives the display data from the second server in response to the request for receiving the display data.

Item. 6 of the present invention is the printing system according to Item. 5, wherein the print output device preferably transmits the display data to the second server as an HTTP request to the second server, the information terminal preferably displays the print preview screen based on the display data transmitted through the second server, and when receiving, from the information terminal, a print output instruction which is based on an operation instruction from a user who checks the print preview screen, the second server preferably transmits the print output instruction to the print output device as an HTTP response to the HTTP request.

Item. 7 of the present invention is the printing system according to Item. 2, wherein the print output device preferably determines whether the information terminal is in the predetermined LAN, preferably transmits the display data to the information terminal through the second server when it is determined that the information terminal is not in the predetermined LAN, and preferably transmits the display data to the information terminal not through the second server when it is determined that the information terminal is in the predetermined LAN.

Item. 8 of the present invention is the printing system according to Item. 2, wherein the print output device preferably transmits device specification information to specify the print output device to the information terminal through the second server, and the information terminal preferably determines whether the print output device and the information terminal are in the same LAN based on the device specification information received from the print output device through the second server, preferably transmits the display data to the information terminal through the second server when it is determined that the print output device and the information terminal are not in the same LAN, and preferably transmits the display data to the information terminal not through the second server when it is determined that the print output device and the information terminal are in the same LAN.

Item. 9 of the present invention is a print output device preferably including: a reception unit configured to receive a print request which indicates that a print output related to a designated file designated by an information terminal is to be performed in the print output device and which is transmitted from a first server arranged outside a predetermined LAN to which the print output device belongs; a generation unit configured to generate display data of a print preview screen based on print setting included in the print request; and a transmission unit configured to transmit the display data to the information terminal.

Item. 10 of the present invention is the print output device according to Item. 9, wherein the transmission unit preferably transmits the display data to a second server from the print output device as an HTTP request to the second server, and the reception unit preferably receives a print output instruction, which is transmitted from the information terminal to the print output device through the second server after the print preview screen based on the display data transferred from the second server to the information terminal is checked, from the second server as an HTTP response to the HTTP request.

Item. 11 of the present invention is the print output device according to Item. 9, further preferably including a determination unit configured to determine whether the information terminal is in the predetermined LAN, wherein the transmission unit preferably transmits the display data to the information terminal through the second server when it is determined that the information terminal is not in the predetermined LAN, and preferably transmits the display data to the information terminal not through the second server when it is determined that the information terminal is in the predetermined LAN.

To achieve the abovementioned object, according to an aspect, a non-transitory recording medium storing a computer readable program reflecting one aspect of the present invention causes a computer, which is included in an information terminal, to execute a) a step of transmitting, to a first server arranged outside a predetermined LAN, a print request indicating that a print output related to a designated file is to be performed in a print output device arranged inside the predetermined LAN, and b) a step of receiving display data of a print preview screen which data is generated by the print output device based on print setting included in the print request transferred from the first server to the print output device.

Item. 13 of the present invention is the non-transitory recording medium storing a computer readable program according to Item. 12, the program preferably causing the computer to execute c) a step of receiving, through the second server, device specification information to specify the print output device, and d) a step of determining whether the print output device and the information terminal are in the same LAN based on the device specification information, wherein the step d) includes d-1) a step of notifying, when a first determination result indicating that the print output device and the information terminal are not in the same LAN is acquired, the first determination result to the print output device, and d-2) a step of notifying, when a second determination result indicating that the print output device and the information terminal are in the same LAN is acquired, the second determination result to the print output device, and the step b) includes b-1) a step of receiving the display data from the print output device through the second server when the first determination result is acquired, and b-2) a step of receiving the display data from the print output device not through the second server when the second determination result is acquired.

To achieve the abovementioned object, according to an aspect, a printing system reflecting one aspect of the present invention comprises: a print output device arranged inside a predetermined LAN; a first server arranged outside the predetermined LAN; and an information terminal configured to transmit, to the first server, a print request which indicates that a print output related to a designated file is to be performed in the print output device and which is based on a user operation using a first print setting screen, wherein the first server transfers the print request to the print output device when receiving the print request from the information terminal, and the print output device generates display data of a second print setting screen, with which a setting item not included in the first print setting screen and/or setting contents which cannot be set on the first print setting screen can be set, and transmits the display data to the information terminal.

Item. 15 of the present invention is a print output device preferably including: a reception unit configured to receive a print request which indicates that a print output set based on user operation using a first print setting screen in an information terminal is to be performed in the print output device and which is transmitted from a first server arranged outside a predetermined LAN to which the print output device belongs; a generation unit configured to generate display data of a second print setting screen with which a setting item not included in the first print setting screen and/or setting contents which cannot be set on the first print setting screen can be set; and a transmission unit configured to transmit the display data to the information terminal.

To achieve the abovementioned object, according to an aspect, a non-transitory recording medium storing a computer readable program reflecting one aspect of the present invention causes a computer, which is included in an information terminal, to execute a) a step of transmitting a print request, which is based on user operation using a first print setting screen and which indicates that a print output related to a designated file is to be performed in a print output device arranged inside a predetermined LAN, to the print output device through a first server arranged outside the predetermined LAN, and b) a step of receiving display data of a second print setting screen with which a setting item not included in the first print setting screen and/or setting contents which cannot be set on the first print setting screen can be set, the display data of the print setting screen being generated by the print output device.

To achieve the abovementioned object, according to an aspect, a printing system reflecting one aspect of the present invention comprises: a print output device arranged inside a predetermined LAN; a first server arranged outside the predetermined LAN; and an information terminal configured to transmit, to the first server, a print request indicating that a print output related to a designated file is to be performed in the print output device, wherein the first server transfers the print request to the print output device when the print request is received from the information terminal, and the print output device generates display data of a status information display screen to display status information of the print output device and transmits the display data to the information terminal after the print request is received.

Item. 18 of the present invention is a print output device preferably including: a reception unit configured to receive a print request which indicates that a print output related to a designated file designated by an information terminal is to be performed in the print output device and which is transmitted from a first server arranged outside a predetermined LAN to which the print output device belongs; a generation unit configured to generate display data of a status information display screen to display status information of the print output device; and a transmission unit configured to transmit the display data to the information terminal after the print request is received.

Item. 19 of the present invention is a non-transitory recording medium storing a computer readable program preferably causing a computer, which is included in an information terminal, to execute a) a step of transmitting a print request, which indicates that a print output related to a designated file is to be performed in a print output device arranged inside a predetermined LAN, to a first server arranged outside the predetermined LAN, and b) a step of receiving display data of a status information display screen to display status information of the print output device, the display data being generated according to the print request transferred from the first server to the print output device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a view illustrating the print setting screen transmitted from the cloud server;

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

1-1. Configuration Outline

Figure 1:
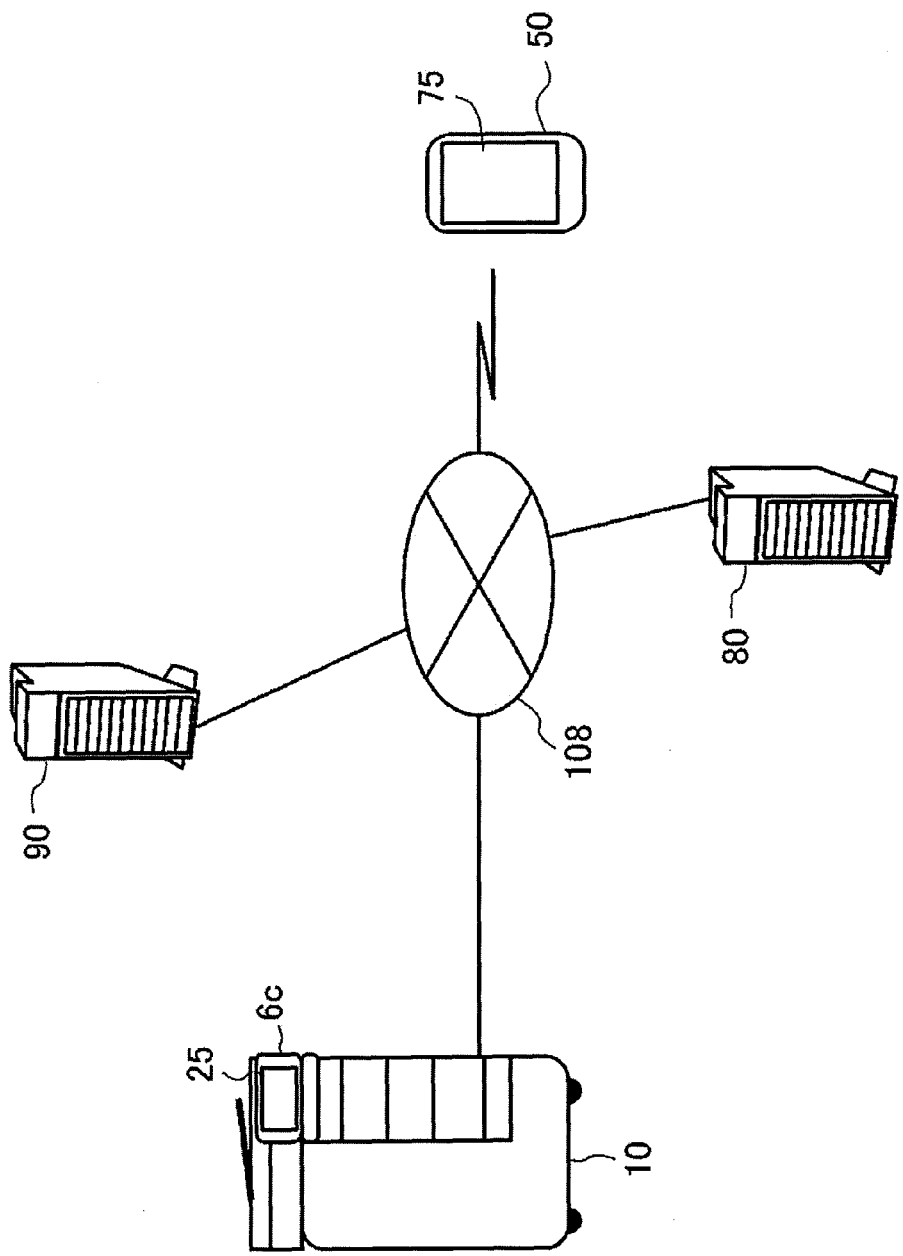
FIG. 1 is a view illustrating a printing system according to a first embodiment.

FIG. 1 is a view illustrating a printing system 1 according to a first embodiment of the present invention. As illustrated in FIG. 1, the printing system 1 includes an MFP (print output device) 10, an information terminal 50, and server computers (hereinafter, also simply referred to as server) 80 and 90.

The server 90 is a server (cloud server) which provides a cloud service (such as service to store electronic document (electronic file) and cloud print output service). The server 90 is also referred to as a "print service providing server."

Further, the server 80 includes, for example, a function to mediate the information terminal 50 and the MFP 10. Since being a server to perform mediation or the like of notification processing from the MFP 10 to the information terminal 50, the server 80 is also referred to as a "notification server" or a "mediation server." The server 80 is used, for example, by a person who is different from a person providing a cloud service with the server 90 (that is, for example, by person who is identical to person providing print application of information terminal 50). The server 80 may be arranged in a cloud or in a LAN in a specific company.

The MFP 10, the information terminal 50, and the servers 80 and 90 are connected to each other through a network (communication network) 108. The network 108 includes a local area network (LAN), the Internet, or the like. Further, a mode of connection to the network 108 may be wired connection or wireless connection. For example, the MFP 10 and the servers 80 and 90 are connected to the network 108 in a wired manner and the information terminal 50 is connected to the network 108 in a wireless manner.

The information terminal 50 previously acquires a communication destination address (such as IP address (or uniform resource locator (URL))) of the server 80 and a communication destination address of the server 90. With utilization of each of the known communication destination addresses, communication from the information terminal 50 to each of the servers 80 and 90 (such as hypertext transfer protocol (HTTP) communication) can be performed. Similarly, the MFP 10 already acquires the communication destination address of the server 80 and the communication destination address of the server 90. With utilization of each of the known communication destination addresses, communication from the MFP 10 to each of the servers 80 and 90 can be performed. The other communication will be described later in detail.

In this embodiment, a technology to solve a problem, such as what is described in the above, with respect to the print preview screen is described as an example. More specifically, a print preview screen including more various kinds of information is generated in the MFP 10 and the print preview screen is transmitted from the MFP 10 to the information terminal 50. Accordingly, the information terminal 50 can flexibly acquire more various kinds of information. In the following, such a mode will be described in more detail.

1-2. Configuration of Print Output Device

Figure 2:
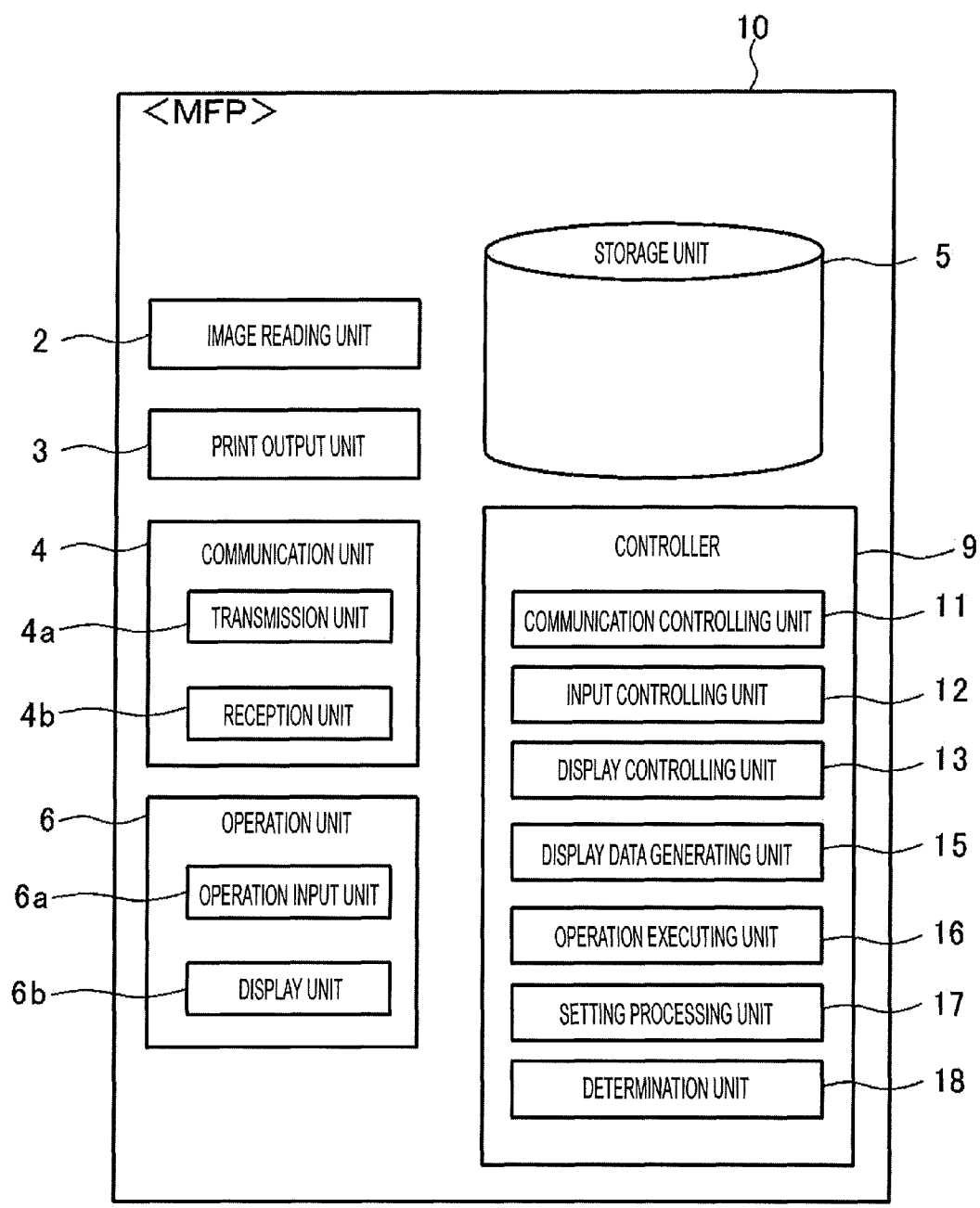
FIG. 2 is a view illustrating a function block of an MFP (print output device)

FIG. 2 is a view illustrating a function block of a print output device 10. Here, as the print output device 10, a multi-functional peripheral (MFP) is illustrated as an example. In FIG. 2, a function block of the MFP 10 is illustrated.

The MFP 10 is a device including a scanning function, a copy function, a facsimile function, a box storage function, and the like (which device is also referred to as multifunction machine). More specifically, as illustrated in the function block diagram in FIG. 2, the MFP 10 includes an image reading unit 2, a print output unit 3, a communication unit 4, a storage unit 5, an operation unit 6, a controller 9, and the like and realizes various functions by operating these integrally.

The image reading unit 2 is a processing unit to optically read (scan) a document placed at a predetermined position in the MFP 10 and to generate image data of the document (also referred to as document image or scanned image). The image reading unit 2 may be also referred to as a scanning unit.

The print output unit 3 is an output unit to perform a print output of an image onto various media such as paper based on data related to a print object.

The communication unit 4 is a processing unit which can perform facsimile communication through a public line or the like. Further, the communication unit 4 can perform network communication through the network 108. In the network communication, for example, various protocols such as a transmission control protocol/Internet protocol (TCP/IP) are used. With utilization of the network communication, the MFP 10 can transmit/receive various kinds of data to/from an intended destination (such as information terminal 50). The communication unit 4 includes a transmission unit 4a to transmit various kinds of data and a reception unit 4b to receive various kinds of data.

The storage unit 5 includes a storage device such as a hard disk drive (HDD). The storage unit 5 stores image data or the like of each operation screen.

The operation unit 6 includes an operation input unit 6a to receive an operation input with respect to the MFP 10 and a display unit 6b to perform a display output of various kinds of information.

In the MFP 10, a substantially tabular operation panel unit 6c (see FIG. 1) is provided. Further, the operation panel unit 6c includes a touch panel 25 on a front side (see FIG. 1). The touch panel 25 functions as a part of the operation input unit 6a and as a part of the display unit 6b. The touch panel 25 is formed by embedment of various sensors or the like into a liquid crystal display panel. The touch panel 25 can display various kinds of information and can receive various operation inputs from an operator.

The controller 9 is a controlling device which is included in the MFP 10 and which controls the MFP 10 integrally. The controller 9 is configured as a computer system including a CPU, various kinds of semiconductor memories (RAM and ROM), and the like. In the CPU, the controller 9 executes a predetermined software program (hereinafter, also simply referred to as program) stored in the ROM (such as EEPROM) and realizes various processing units. Note that the program (more specifically, program module group) may be installed into the MFP 10 through a portable recording medium such as a USB memory, the network 108, or the like.

More specifically, as illustrated in FIG. 2, the controller 9 realizes various processing units including a communication controlling unit 11, an input controlling unit 12, a display controlling unit 13, a display data generating unit 15, an operation executing unit 16, a setting processing unit 17, and a determination unit 18 by execution of the above described program.

The communication controlling unit 11 is a processing unit which works together with the communication unit 4 and controls an operation of communicating with a different device (such as information terminal 50 and server 80 and 90). The communication controlling unit 11 includes a transmission controlling unit to control an operation of transmitting various kinds of data and a reception controlling unit to control an operation of receiving various kinds of data.

The input controlling unit 12 is a control unit to control an operation inputting operation with respect to the operation input unit 6a (such as touch panel 25). For example, the input controlling unit 12 controls an operation to receive an operation input (such as designation input from user) on an operation screen displayed on the touch panel 25.

The display controlling unit 13 is a processing unit to control a display operation on the display unit 6b (such as touch panel 25).

The display data generating unit 15 is a processing unit to generate various kinds of display data (such as display data of print preview screen 330 (described later)).

The operation executing unit 16 is a processing unit to execute various kinds of processing related to print output processing.

The setting processing unit 17 is a processing unit to execute print setting processing in the MFP 10.

The determination unit 18 is a processing unit to execute various kinds of determination processing.

1-3. Configuration of Information Terminal

Next, a configuration of the information terminal (also referred to as remote operation device) 50 will be described. Since being a device to control a print output by the MFP 10, the information terminal 50 is also referred to as a print controlling device.

The information terminal 50 is an information input/output terminal device which can perform network communication with the MFP 10, the servers 80 and 90, and the like.

Here, as the information terminal 50, a tablet terminal is described as an example. However, this is not the limitation and the information terminal 50 may be a smartphone, a personal computer, or the like. The information terminal 50 may be a mobile device (such as mobile information terminal) or a stationary device.

Figure 3:
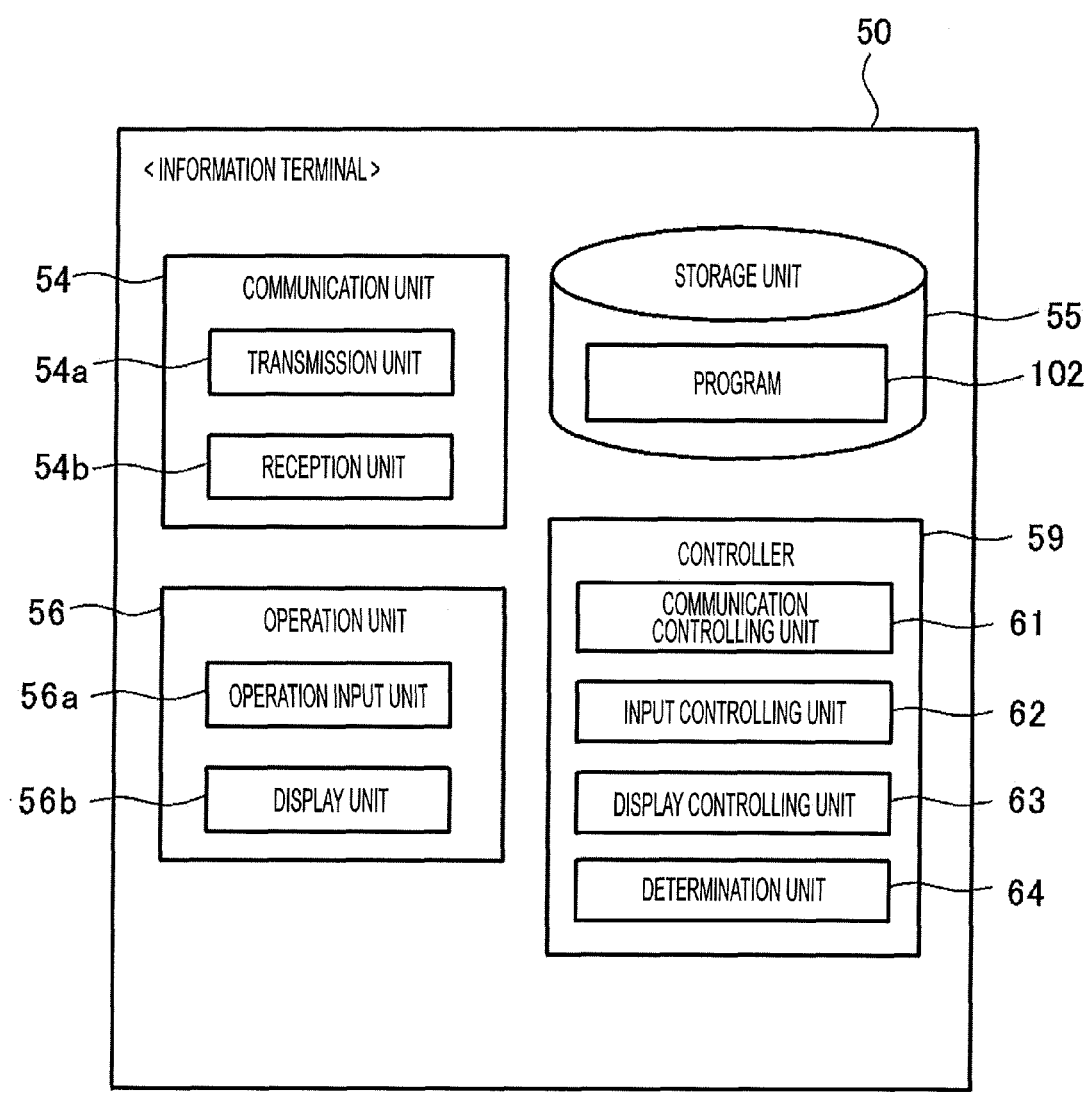
FIG. 3 is a function block diagram illustrating a schematic configuration of an information terminal.

FIG. 3 is a function block diagram illustrating a schematic configuration of the information terminal 50.

As illustrated in the function block diagram in FIG. 3, the information terminal 50 includes a communication unit 54, a storage unit 55, an operation unit 56, a controller 59, and the like and realizes various functions by operating these units integrally.

The communication unit 54 can perform network communication through the network 108. In the network communication, for example, various protocols such as a transmission control protocol/Internet protocol (TCP/IP) are used. With utilization of the network communication, the information terminal 50 can transmit/receive various kinds of data to/from an intended destination (such as MFP 10). The communication unit 54 includes a transmission unit 54a to transmit various kinds of data and a reception unit 54b to receive various kinds of data.

The storage unit 55 includes a storage device such as a non-volatile semiconductor memory.

The operation unit 56 includes an operation input unit 56a to receive an operation input with respect to the information terminal 50 and a display unit 56b to perform a display output of various kinds of information. In the information terminal 50, a touch panel 75 which is configured by embedment of various sensors or the like into a liquid crystal display panel (see FIG. 1) is provided. The touch panel 75 functions as a part of the operation input unit 56a and as a part of the display unit 56b.

The controller 59 in FIG. 3 is a controlling device which is included in the information terminal 50 and which controls the information terminal 50 integrally. The controller 59 is configured as a computer system including a CPU, various kinds of semiconductor memories (RAM and ROM), and the like. In the CPU, the controller 59 executes a predetermined software program (hereinafter, also simply referred to as program) stored in a storage unit (such as semiconductor memory) and realizes various processing units. Note that the program (more specifically, program module group) may be installed into the information terminal 50 through a portable recording medium such as a USB memory, the network 108, or the like.

In the information terminal 50, an application software program 102 or the like to execute a print output using the server 90 (cloud print) is installed. The program 102 includes a function to make the MFP 10 perform a print output through the server 90 and a function to transmit/receive data to/from the MFP 10 through the server 80 (or directly).

More specifically, the controller 59 realizes various processing units including a communication controlling unit 61, an input controlling unit 62, a display controlling unit 63, and a determination unit 64 by execution of the program 102 or the like.

The communication controlling unit 61 is a processing unit to work together with the communication unit 54 or the like and to control an operation of communicating with the MFP 10 or the like.

The input controlling unit 62 is a control unit to control an operation inputting operation with respect to the operation input unit 56a (such as touch panel 75).

The display controlling unit 63 is a processing unit to control a display operation on the display unit 56b (such as touch panel 75).

The determination unit 64 is a processing unit to execute various kinds of determination processing.

1-4. Operation

Figure 4:
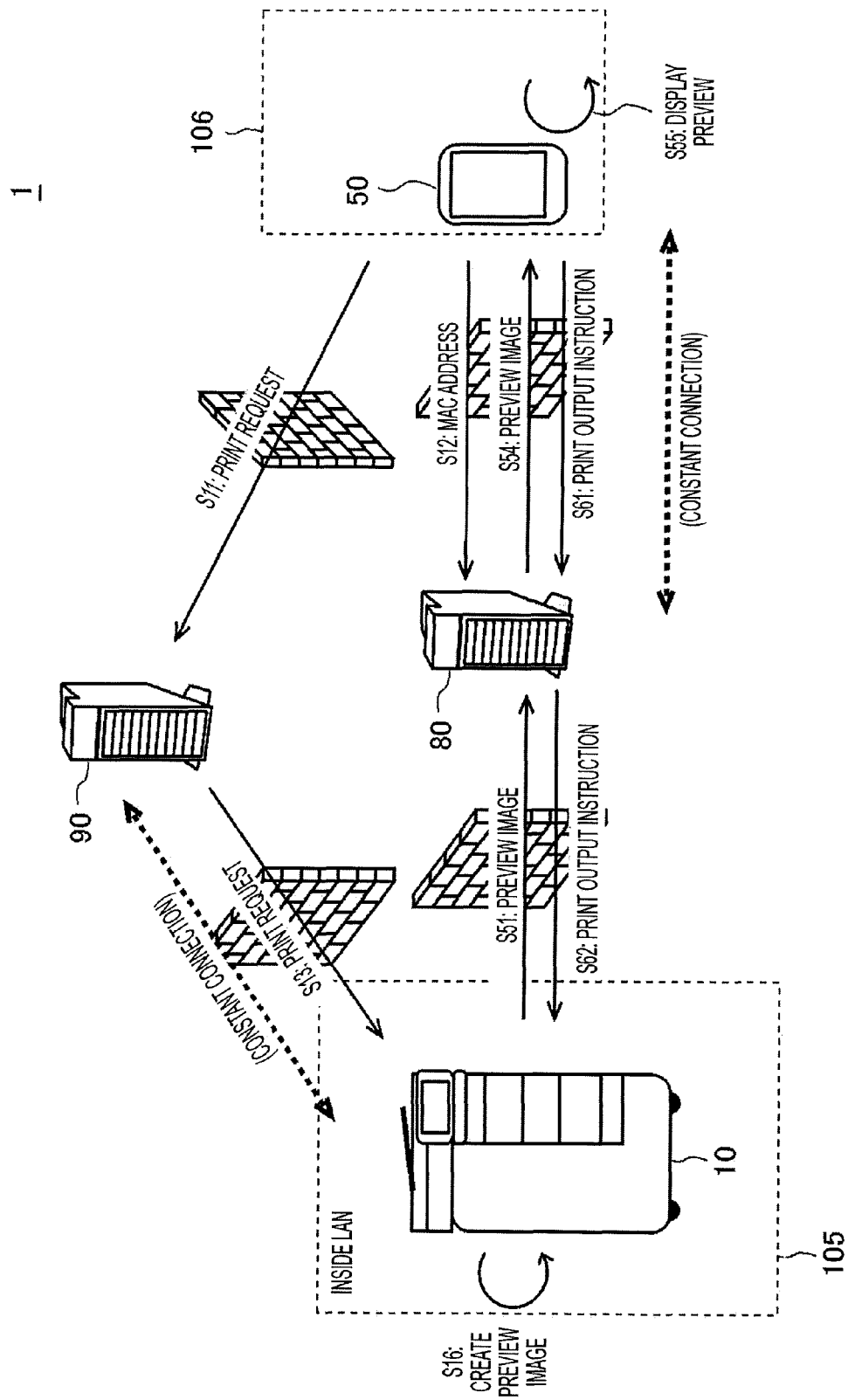
FIG. 4 is a conceptual diagram illustrating an operation in a printing system.
Figure 5:
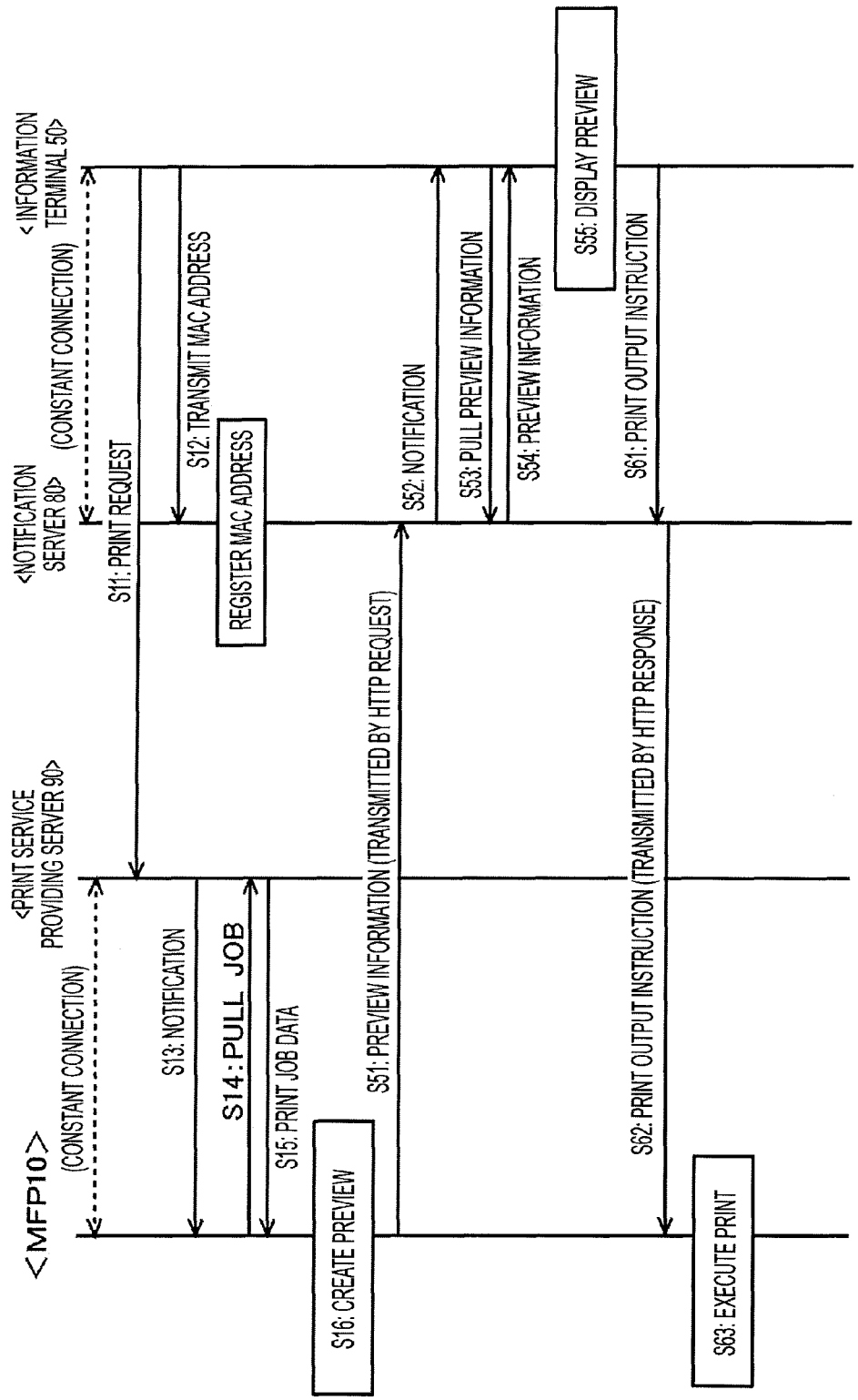
FIG. 5 is a timing chart illustrating an operation example in the printing system.

FIG. 4 is a conceptual diagram illustrating an operation in the present system and FIG. 5 is a timing chart illustrating an operation example of the present system. In the following, with reference to FIG. 4 and FIG. 5, an operation in the present system 1 will be described.

As illustrated in FIG. 4, the MFP 10 is in a predetermined local area network (LAN) 105 provided in a company or the like. The server 90 is in the outside of the predetermined LAN 105. The server 80 is also in the outside of the predetermined LAN 105. Further, the information terminal 50 may be in the predetermined LAN 105. However, here, it is assumed that the information terminal 50 is in the outside of the predetermined LAN 105. More specifically, it is assumed that the information terminal 50 is in a LAN 106 different from the LAN 105.

A firewall is provided between a device in each LAN (such as MFP 10 or information terminal 50) and a device in the outside of the LAN (such as server 90 or server 80). Access from the device inside the LAN to the device outside the LAN with a general protocol (such as hypertext transfer protocol (HTTP)) (which access is, for example, HTTP request) passes through the firewall and the access is permitted. However, an access in the opposite direction (access from device outside LAN to device inside LAN) is blocked by the firewall. That is, with the general protocol (such as HTTP), the device outside the LAN cannot access the device inside the LAN directly.

Thus, in this embodiment, in order to perform access from the device outside the LAN to the device inside the LAN, a message session (communication session) is established (as exception of firewall) between the device outside the LAN and the device inside the LAN when necessary and access from the device outside the LAN to the MFP 10 inside the LAN is performed. Accordingly, direct access from the device outside the LAN to the device inside the LAN (more specifically, access from server 90 to MFP 10 and access from server 80 to information terminal 50) can be performed. As such a message session, for example, an eXtensible Messaging and Presence Protocol (XMPP) is used. More specifically, after the MFP 10 is activated, a message session by the XMPP is constantly established between the server 90 and the MFP 10 (also expressed as "constant connection"). Accordingly, access from the server 90 to the MFP 10 can be performed. Similarly, after the information terminal 50 is activated (more specifically, after program 102 is activated), a message session by the XMPP is also constantly established between the server 80 and the information terminal 50 (also expressed as "constant connection"). Accordingly, access from the server 80 to the information terminal 50 can be performed.

On the other hand, in the access from the device inside the LAN to the device outside the LAN (more specifically, access from information terminal 50 to server 90, access from MFP 10 to server 80, and the like), communication processing by a hypertext transfer protocol (HTTP) (including hypertext transfer protocol secure (HTTPS)) is performed. Accordingly, it is possible to prevent a waste of a resource in each device (specifically MFP 10 or information terminal 50) compared to a case where all access is realized by constant connection by the XMPP or the like.

Figure 9:
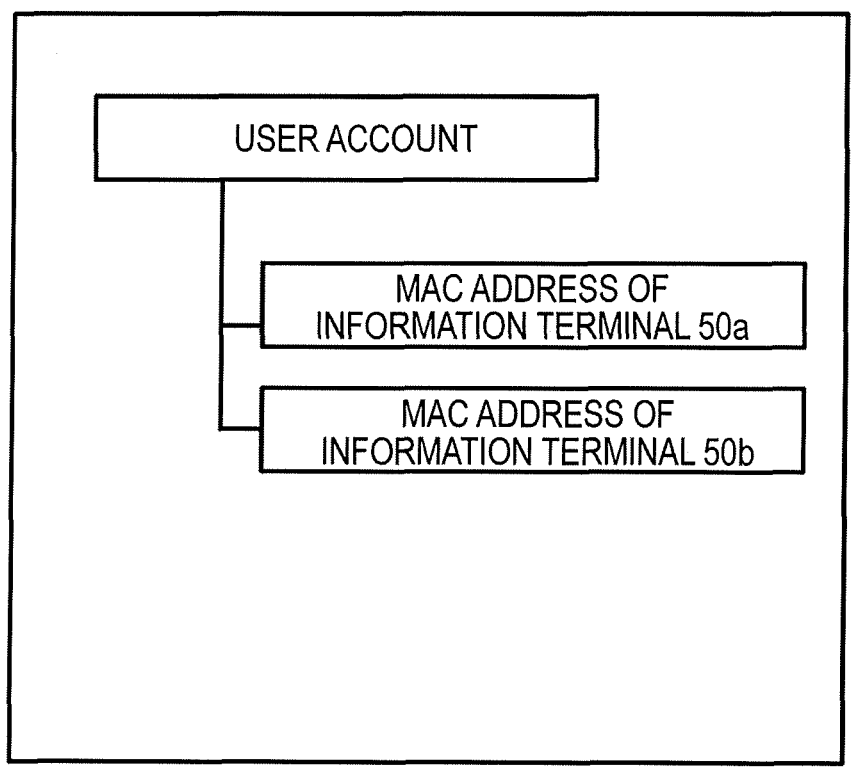
FIG. 9 is a view illustrating a data table which stores information to associate a user account and an information terminal.

Further, before a timing chart in FIG. 5 is executed, a user account of each user in the cloud printing service and a media access control address (MAC address) of a terminal (information terminal) 50 used by the user are associated to each other and previously registered (stored) into the server 80 (see FIG. 9). More specifically, at a time point at which the predetermined program 102 is installed into the information terminal 50 (or time point of registering operation performed thereafter), both of the user account input into the information terminal 50 and the MAC address of the information terminal 50 are transmitted from the information terminal 50 to the server 80 and the two are associated to each other and registered into a data table 160 in the server 80. In the data table 160 in FIG. 9, a state in which MAC addresses of a plurality of information terminals 50 are associated to a user account and registered is illustrated.

Before the timing chart in FIG. 5 is executed, an MFP which can be used by each user and various setting items (part of setting item) in the MFP are previously registered into the server 90.

Then, at an arbitrary time point, execution of an operation in the timing chart in FIG. 5 is started. More specifically, a user activates the program 102 in the own information terminal 50 and assigns a print instruction by using the program 102. In other words, the program 102 of the information terminal 50 receives the print instruction from the user.

Figure 6:
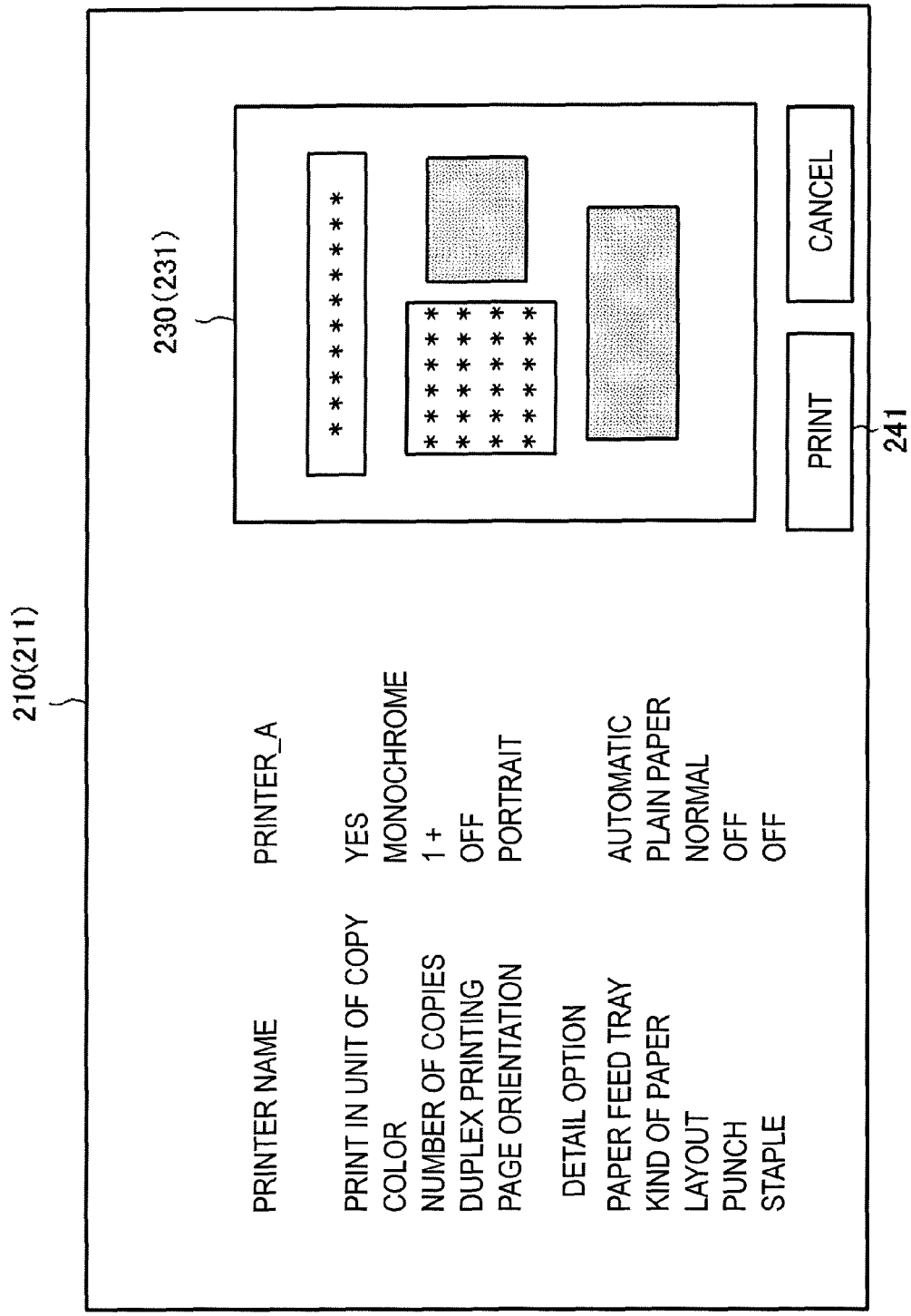
FIG. 6 is a view illustrating a print setting screen transmitted from a cloud server.

More specifically, by using a designation screen displayed on the display unit 56*b*, the user designates an electronic document (designated file) to be processed in print output processing and an MFP to execute the print output processing. As the electronic document (electronic file) to be processed in the print output processing, an electronic document or the like stored in the server 90 is designated. The designation screen is a screen displayed onto the display unit 56*b* based on the display data which data is transmitted from the server 90. Further, the user performs print setting operation by using a print setting screen 210 (211) in FIG. 6. More specifically, setting contents related to various setting items such as "color," "number of copies," "duplex printing (on/off)," "page orientation," "layout," and "staple" are set. The print setting screen 210 is a display screen which is based on the display data transmitted from the server 90. Here, it is assumed that an MFP which can perform a print output and various setting items (part of setting item) in the MFP are previously registered in the server 90 and that the print setting screen 210 also reflects (display) the various setting items.

Note that at this time point, a print preview screen 230 (231) is also displayed on the print setting screen 210 transmitted from the server 90. However, as described above, this print preview screen 231 only reflects setting contents of the part of the setting items (such as "color," and "page orientation") and does not reflect setting contents of the other setting items (such as "layout," "punch," and "staple").

For example, as illustrated in FIG. 7, when setting contents of the setting item "punch" is changed from "off" to "two holes," display data of the print preview screen 230 after the change is generated in the server 90 and the display data is transmitted from the server 90 to the information terminal 50. Then, the print preview screen 230 after the change (FIG. 7) is displayed on the information terminal 50 based on the display data. However, the print preview screen 230 (232) does not reflect setting contents of the other setting items (such as "layout," "punch," and "staple").

Figure 8:
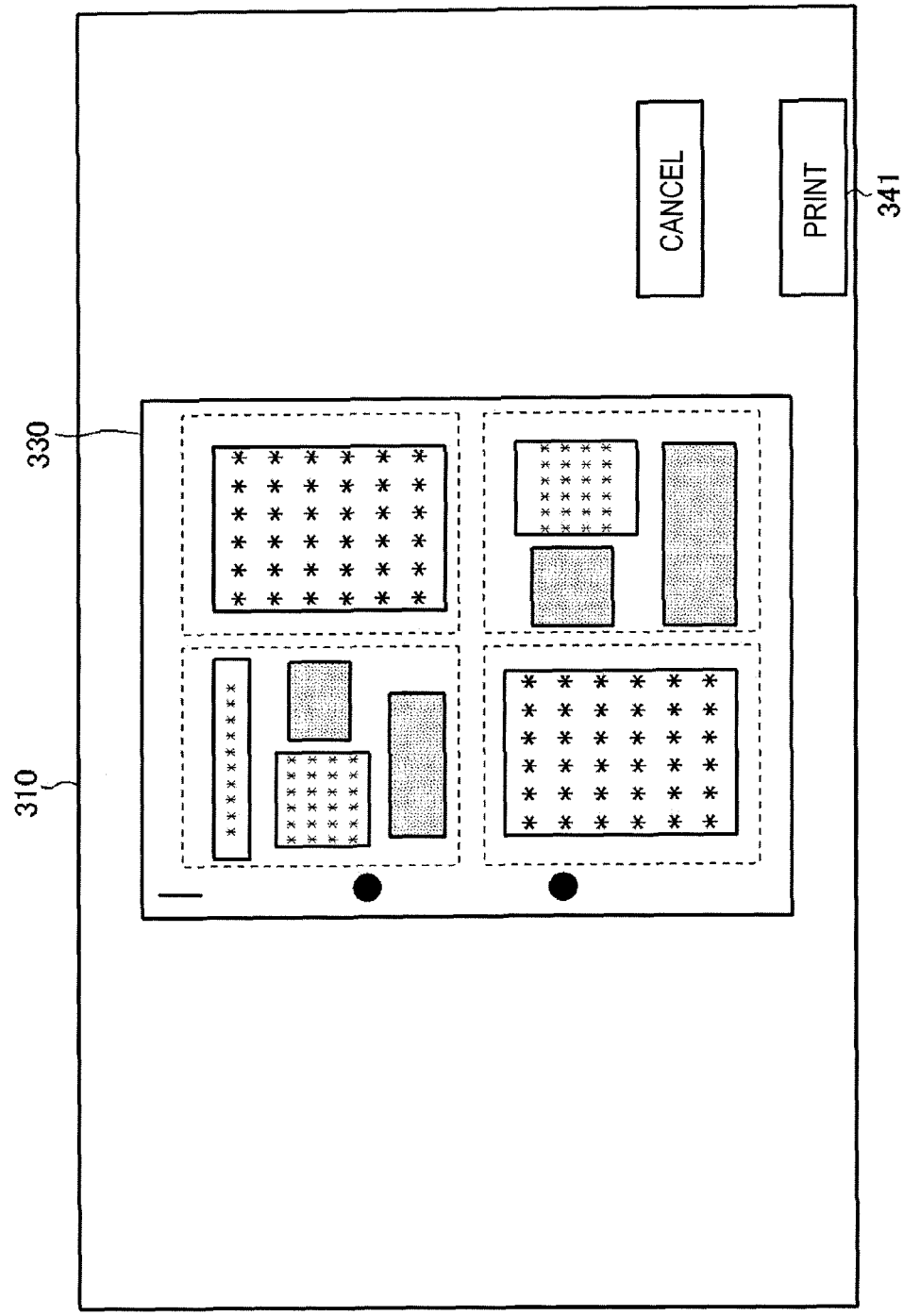
FIG. 8 is a view illustrating a print preview screen transmitted from the MFP.

On the other hand, in this embodiment, as described in the following, display data of a print preview screen 330 including a print preview image such as what is illustrated in FIG. 8 is generate by the MFP 10 and the display data of the print preview screen 330 is transmitted from the MFP 10 to the information terminal 50. Then, based on the display data of the print preview screen 330, the print preview screen 330 is displayed onto the display unit 56*b* (such as touch panel 75) in the information terminal 50.

More specifically, first, the user presses a print button 241 on the print setting screen 210 (see FIG. 7) in print setting operation using the print setting screen 210. Accordingly, the information terminal 50 transmits a print request which is based on user operation using the print setting screen 210 or the like (print request indicating that print output related to designated file is to be performed in MFP 10) to the MFP 10 through the server 90. Note that the print request can be also expressed as a print request indicating that a print output which is set based on user operation using the print setting screen 210 in the information terminal 50 is to be performed in the MFP 10.

More specifically, first, the information terminal 50 transmits the print request to the server 90 (step S11). In the print request, a user account, a designated print output device ID (MAC address or the like of MFP 10 designated as print output device), a designated document ID (designated file ID designated as object of print output), a print setting, and the like are included.

Further, the information terminal 50 transmits, to the server 80, identification information (MAC address) of the own device which is a source of the print request (transmission source device (also referred to as source device of request)) as information to specify a source of the print request (specification information) (step S12).

Next, when receiving the print request from the information terminal 50, the server 90 uses a message session by the XMPP and transfers the print request to the MFP 10 (step S13). Based on a designated document ID included in the print request, the MFP 10 transmits, to the server 90, a request for transmission of print job data related to an electronic document with the designated document ID (step S14). The server 90 transmits the print job data to the MFP 10 in response to the transmission request (step S15). For data communication processing in step S14 and step S15, a protocol such as the HTTP (suitable to data communication with relatively large amount (compared to XMPP)) is used. More specifically, an HTTP request is transmitted from the MFP 10 to the server 90 in step S14 and a print job data is transmitted from the server 90 to the MFP 10 as an HTTP response corresponding to the HTTP request.

When receiving the print job data, the MFP 10 generates display data of the print preview screen 330 (see FIG. 8) based on a print setting and the like included in the print job data (step S16).

Then, the MFP 10 transmits the display data or the like of the print preview screen 330 to the information terminal 50 through the server 80.

More specifically, first, the MFP 10 transmits the display data of the print preview screen 330 and a user account of a requesting user to the server 80 (step S51). Data transmission processing in step S51 (processing of transmitting display data or the like of print preview screen 330) is performed by using an HTTP request. Note that a response to the HTTP request is made in step S62 described later.

With reference to the data table 160 in FIG. 9, the server 80 specifies one or more MAC addresses corresponding to the user account received from the MFP 10. Then, among the one or more MAC addresses, the server 80 determines that an address identical to the MAC address transmitted in step S12 is an MAC address which is currently used by a user (currently-used MAC address) (in other words, MAC address of source device of print request). Further, with respect to the information terminal 50 with the currently-used MAC address, the server 80 notifies a request to receive the display data of the print preview screen 330 from the server 80 (request for reception of display data) (step S52). Note that for the communication in step S52, a protocol such as the XMPP is used.

The information terminal 50 which receives the reception request transmits, to the server 80, a request for transmission of the display data of the print preview screen 330 (step S53). According to the transmission request, the server 80 transmits the display data of the print preview screen 330 to the information terminal 50 (step S54). In such a manner, the information terminal 50 receives the display data from the server 80 in response to the request for reception of the display data. Note that for the data communication processing in step S53 and step S54, a protocol such as an HTTP is used. More specifically, the HTTP request is transmitted from the information terminal 50 to the server 80 in step S53 and the display data is transmitted from the server 80 to the information terminal 50 as an HTTP response corresponding to the HTTP request.

Based on the received display data (display data transmitted through server 80), the information terminal 50 displays the print preview screen 330 onto the display unit 56*b* (such as touch panel 75) (step S55).

This print preview screen 330 reflects not only setting contents related to a part of the print setting items ("color" and "page orientation") but also setting contents of the other setting items (such as "layout," "punch," and "staple"). On the print preview screen 330 in FIG. 8, a staple of a stapler is illustrated in an "upper left" part of paper and "two" punch holes are also illustrated. Further, the print preview screen 330 also reflects "4 in 1" (setting in which four original pages are collected in one print output page). With such a print preview screen 330, print setting contents can be visually (intuitively) checked.

When looking at the print preview screen 330 and checking that there is no error in the contents, the user presses a print button 341. When the print button 341 is pressed, a print output instruction is transmitted from the information terminal 50 to the MFP 10 through the server 80.

More specifically, first, in response to the pressing on the print button 341, a print output instruction (print output instruction based on operation instruction from user who checks print preview screen 330) is transmitted from the information terminal 50 to the server 80 (step S61). Further, when receiving the print output instruction, the server 80 transfers (transmits) the print output instruction to the MFP 10 (step S62). Note that a protocol such as an XMPP is used for communication in step S61 and a protocol such as an HTTP is used for communication in step S62. For example, in step S62, the server 80 transmits the print output instruction to the MFP 10 as an HTTP response corresponding to the HTTP request in step S51. In other words, as a response to the processing of transmitting the display data or the like of the print preview screen 330 (HTTP request) (step S51), the MFP 10 receives, from the server 80, a print output instruction (HTTP response) transmitted after the print preview screen 330 is checked (step S62).

When receiving the print output instruction, the MFP 10 executes print output processing (step S63). In this print output processing, a print output of a print output product including contents relatively close to (ideally, identical to) contents displayed in a preview in step S55 is performed.

As described above, the print preview screen 230 prepared on the side of the cloud (FIG. 7) only reflects setting contents related to a part of many print setting items (such as setting contents related to print setting item "color" ("full color" or "monochrome") and setting contents related to print setting item "page orientation" ("portrait" or "landscape")). Thus, while a user can check whether setting contents related to the part of the print setting items are right, the user cannot check whether setting contents related to the other print setting item (such as setting contents "upper left" related to print setting item "stapled position") are right with the print preview screen.

On the other hand, according to the above described embodiment, display data of the print preview screen 330 including various kinds of information is transmitted from the MFP 10 to the information terminal 50. Accordingly, the information terminal 50 can acquire a print preview screen including not only information included in the print preview screen 230 previously prepared by the cloud server 90 (such as setting contents of setting item "color") but also information which is not included in the print preview screen 230 previously prepared by the cloud server (such as setting contents of setting item "stapled position"). As a result, the user can check more various kinds of print settings on the print preview screen 330.

In such a manner, since the display data of the print preview screen 330 including more various kinds of information is transmitted from the MFP 10 to the information terminal 50, the information terminal 50 can acquire more various kinds of information flexibly. Further, the print preview screen 330 is displayed by a cooperative operation by the MFP 10, the server 80, and the information terminal 50 without a change in the operation contents (contents of service provided in cloud printing service) in the cloud server 90. Thus, it is possible to acquire more various kinds of information flexibly.

2. Second Embodiment

The second embodiment is a modification example of the first embodiment. In the following, a point different from the first embodiment will be mainly described.

In the above-described first embodiment, display data of the print preview screen 330 is constantly transmitted from the MFP 10 to the information terminal 50 through the server 80 (see FIG. 4).

In the second embodiment, it is changed whether processing of transmitting display data is performed through a server 80 according to a determination whether an information terminal 50 and an MFP 10 belong to different LANs or to the same LAN. More specifically, it is determined by the MFP 10 (more specifically, determination unit 18 realized by controller 9 or the like (see FIG. 2)) whether the information terminal 50 is in a predetermined LAN 105. Then, when it is determined that the information terminal 50 and the MFP 10 belong to different LANs, display data of a print preview screen 330 is transmitted from the MFP 10 to the information terminal 50 through the server 80 (similarly to first embodiment) (see FIG. 10 and FIG. 12). On the other hand, when it is determined that the information terminal 50 and the MFP 10 belong to the same LAN 105 (are in same LAN), the display data of the print preview screen 330 is transmitted from the MFP 10 to the information terminal 50 not through the server 80 (see FIG. 11 and FIG. 13). In the following, such a mode will be described in detail.

Figure 10:
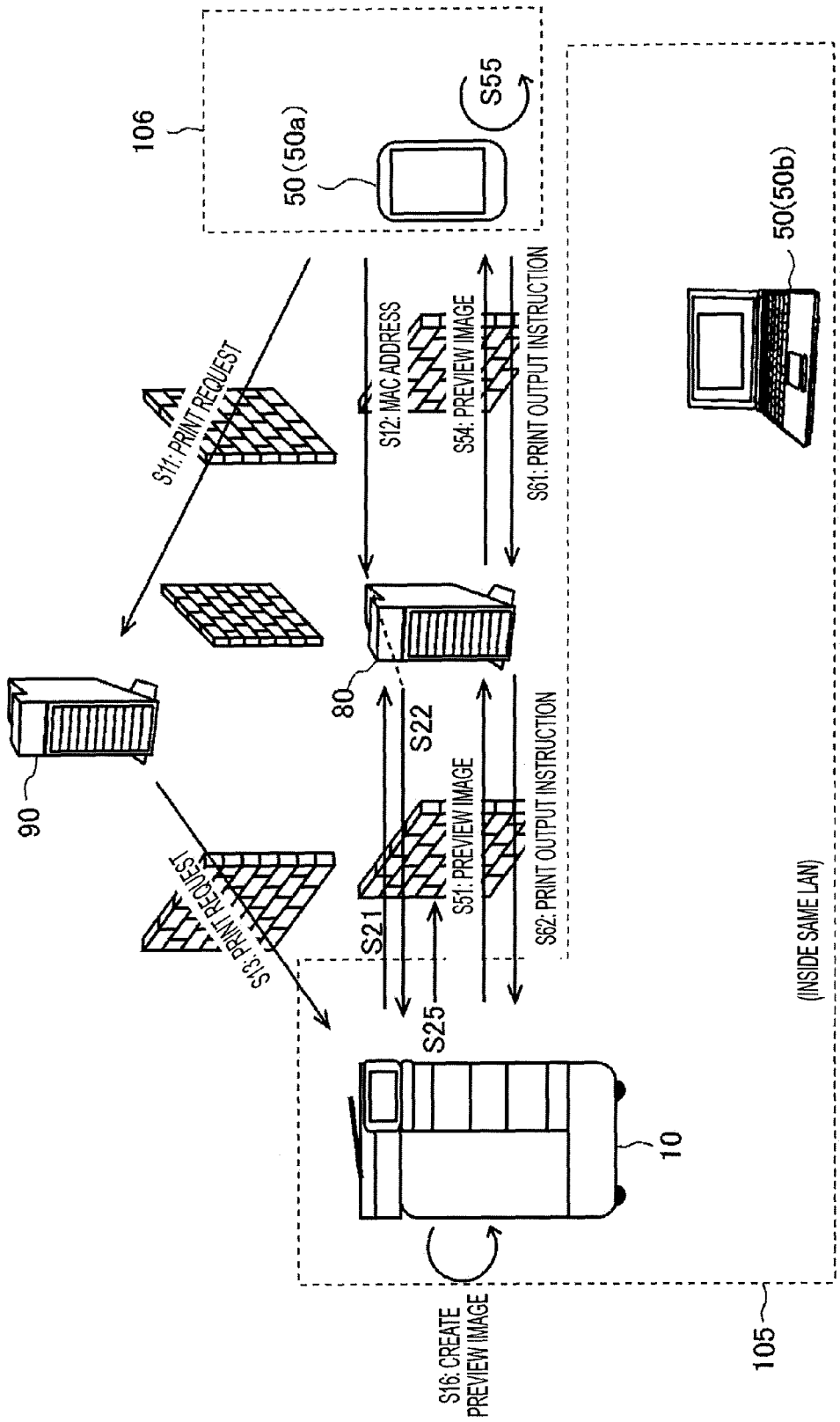
FIG. 10 is a conceptual diagram illustrating an operation of a system according to a second embodiment.
Figure 11:
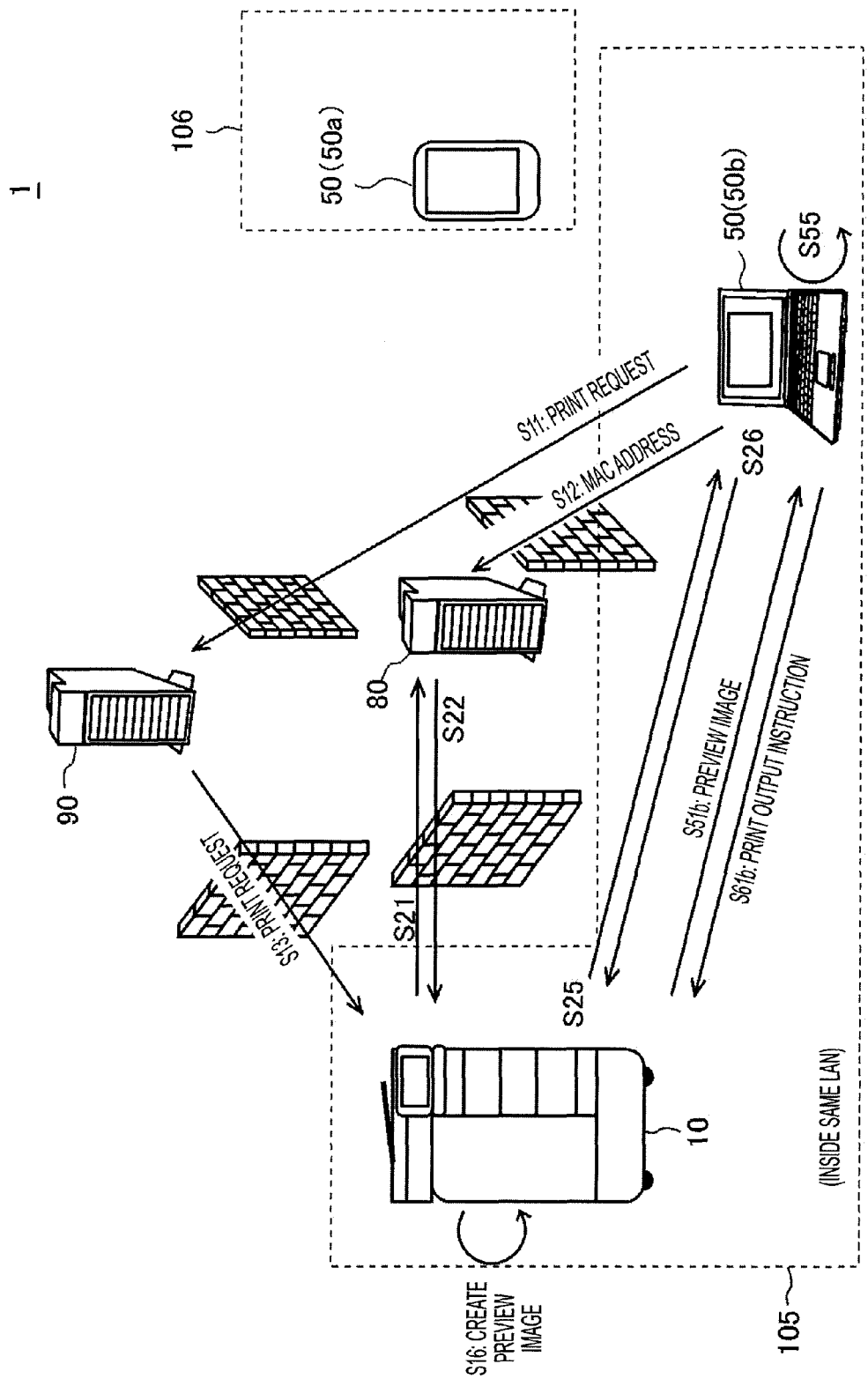
FIG. 11 is a conceptual diagram illustrating an operation of the system according to the second embodiment.
Figure 12:
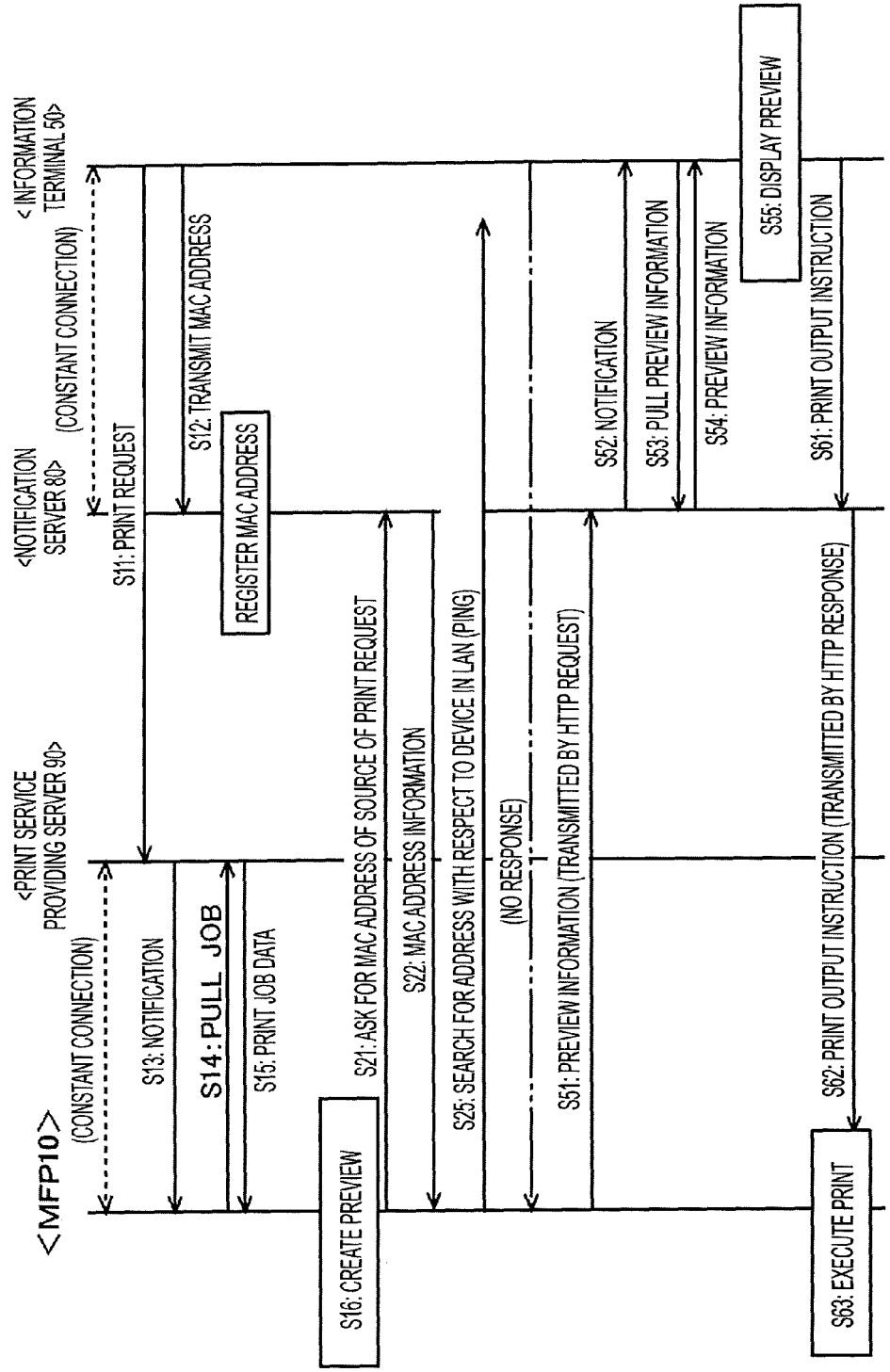
FIG. 12 is a timing chart illustrating an operation example according to the second embodiment.
Figure 13:
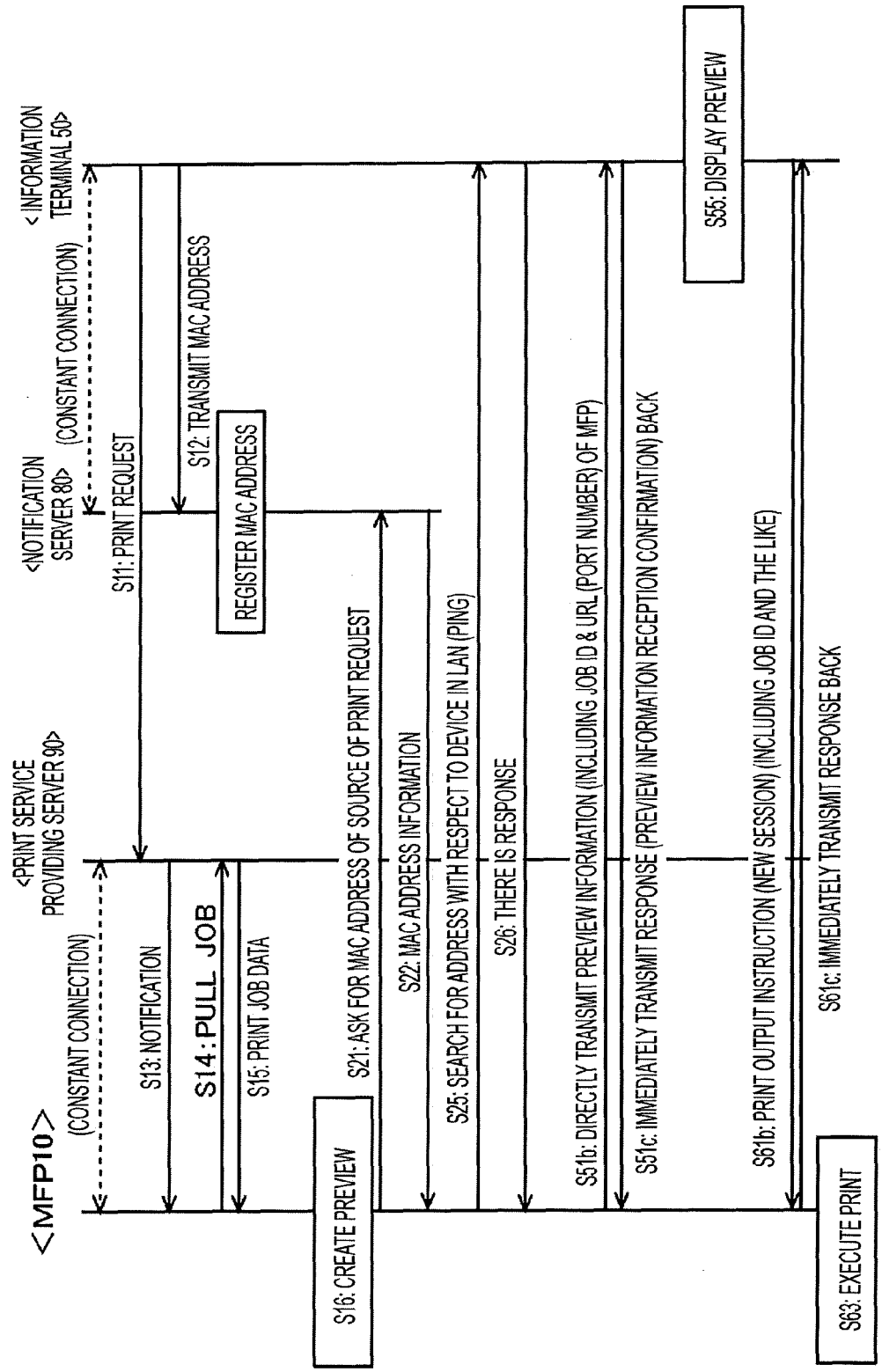
FIG. 13 is a timing chart illustrating an operation example according to the second embodiment.

FIG. 10 and FIG. 11 are conceptual diagrams illustrating operations of a system 1 according to the second embodiment. FIG. 12 and FIG. 13 are timing charts illustrating operation examples according to the second embodiment. In each of FIG. 10 and FIG. 12, an operation of when the information terminal 50 and the MFP 10 belong to different LANs is illustrated. On the other hand, in each of FIG. 11 and FIG. 13, an operation of when the information terminal 50 and the MFP 10 belong to the same LAN is illustrated.

Operations similar to those in the first embodiment are performed in up to step S16.

Then, in step S21 to step S26, processing of determining whether the MFP 10 and the information terminal 50 are in the same LAN 105 is performed.

More specifically, first, in step S21 (see FIG. 10 to FIG. 13), the MFP 10 asks the server 80 for an MAC address of an information terminal 50 which is a source of a print request. In step S22, the server 80 transmits an MAC address received in step S12 (MAC address of information terminal 50) back to the MFP 10. For example, communication in step S21 is realized by an HTTP request and communication in step S22 is realized by an HTTP response corresponding to the HTTP request.

Then, the MFP 10 communicates with a router in the LAN 105 (more specifically, router provided between LAN 105 and external network) and acquires an IP address corresponding to the MAC address acquired in step S22 (step S23 (not illustrated)). Accordingly, the MFP 10 acquires an IP address (local IP address) of the information terminal 50. When the MFP 10 cannot acquire the IP address of the information terminal 50 in step S23, the MFP 10 determines that the information terminal 50 is not in the LAN 105.

Further, when it is possible to receive the IP address of the information terminal 50, the MFP 10 determines whether a device with the IP address is in the LAN 105 in next step S25. For example, the MFP 10 checks whether the IP address is in the same LAN (105) by using a "PING" command. More specifically, when the "PING" command is transmitted (step S25) and there is a response (step S26 (see FIG. 11 and FIG. 13)), it is determined that the device corresponding to the IP address (in other words, information terminal 50 which is source of print request) is in the LAN 105. On the other hand, when the "PING" command is transmitted (step S25) and there is no response (in certain period), it is determined that there is no device 50, which corresponds to the IP address, in the LAN 105 (see FIG. 10 and FIG. 12)). Note that as described above, when it is not possible to acquire the IP address of the information terminal 50 in step S23, it is determined that the information terminal 50 is not in the LAN 105.

When it is determined that the information terminal 50 is not in the LAN 105, the MFP 10 transmits the display data of the print preview screen 330 to the information terminal 50 (such as 50*a*) through the server 80 (step S51 to S54) similarly to the first embodiment (see FIG. 10 and FIG. 12). Further, processing in and after step S55 is performed in a manner similar to that in the first embodiment.

On the other hand, when it is determined that the information terminal 50 is in the LAN 105, the MFP 10 transmits the display data or the like of the print preview screen 330 to the information terminal 50 (such as 50*b*) not through the server 80 (see FIG. 11 and FIG. 13). More specifically, by peer-to-peer communication or the like using a normal protocol (such as TCP/IP) in communication in the LAN 105, the MFP 10 transmits the display data of the print preview screen 330, a job ID, and a URL (including port number) of the MFP to the information terminal 50 (50*b*) (step S51*b*). As a transmission destination address in step S51*b*, an address (such as IP address) acquired in step S22 or S23 is to be used. Note that in communication in step S51*b*, a protocol such as an HTTP can be used. The information terminal 50 immediately transmits a response back (step S51*c*) and a communication session between the information terminal 50 and the MFP 10 is ended (released) once.

Then, based on the received display data, the information terminal 50 (50*b*) displays the print preview screen 330 onto a display unit 56*b* (step S55).

When a user presses a print button 341 (FIG. 8) on the print preview screen 330, the information terminal 50 directly transmits a print output instruction (including job ID or the like received in step S51*b*) to the MFP 10 not through the server 80 (step S61*b*). Here, peer-to-peer communication or the like by a normal protocol (such as TCP/IP) in the LAN 105 is to be used. Alternatively, a protocol such as an HTTP may be used. Further, a source of transmission in communication processing in step S51*b* is to be determined as a transmission destination in step S61*b*. Alternatively, the URL (including port number) of the MFP which URL is transmitted in step S51*b* may be used as a transmission destination in step S61*b*. The communication processing in step S61*b* and the communication processing in step S51*b* are executed by utilization of different communication sessions. Further, the information terminal 50 transmits a response back immediately after step S61*b* (step S61*c*) and the communication session between the information terminal 50 and the MFP 10 is ended immediately.

When receiving a print output instruction (including job ID or the like), the MFP 10 executes print output processing based on the print output instruction (step S63).

Here, in the first embodiment, in response to the HTTP request in step S51, an HTTP response in step S62 is transmitted back (see FIG. 4 and FIG. 5). In a period after transmission of the HTTP request is started and until reception of the HTTP response is completed, the MFP 10 needs to maintain an HTTP session. Thus, a resource of the MFP 10 is constrained for a relatively long period.

On the other hand, in the second embodiment, when it is determined that the information terminal 50 and the MFP 10 are in the same LAN 105, the communication in step S51*b* and the communication in step S61*b* are separately and independently executed (by utilization of different communication sessions). Thus, it is not necessary to maintain a communication session (such as HTTP session) in a period between the communication in step S51*b* and the communication in step S61*b*. In such a manner, in realization of bidirectional communication between the MFP 10 and the information terminal 50 in step S51*b* and step S61*b* (for example, by utilization of protocol for communication in LAN), it is not necessary to maintain a communication state therebetween. Thus, it is possible to use the resource of the MFP 10 effectively.

3. Third Embodiment

The third embodiment is a modification example of the second embodiment. In the following, a point different from the second embodiment will be mainly described.

In the above-described second embodiment, the MFP 10 determines whether the information terminal 50 and the MFP 10 belong to different LANs or the same LAN.

On the other hand, in the third embodiment, a mode in which an information terminal 50 determines whether the information terminal 50 and an MFP 10 belong to different LANs or the same LAN is described as an example. More specifically, such determination processing is performed by the information terminal 50 (more specifically, determination unit 64 (see FIG. 3) realized by program 102, controller 59, and the like).

In the third embodiment, similarly to the second embodiment, it is also changed whether display data of a print preview screen 330 is transmitted through a server 80 or not through the server 80 according to a determination whether the information terminal 50 and the MFP 10 belong to different LANs or the same LAN.

Figure 14:
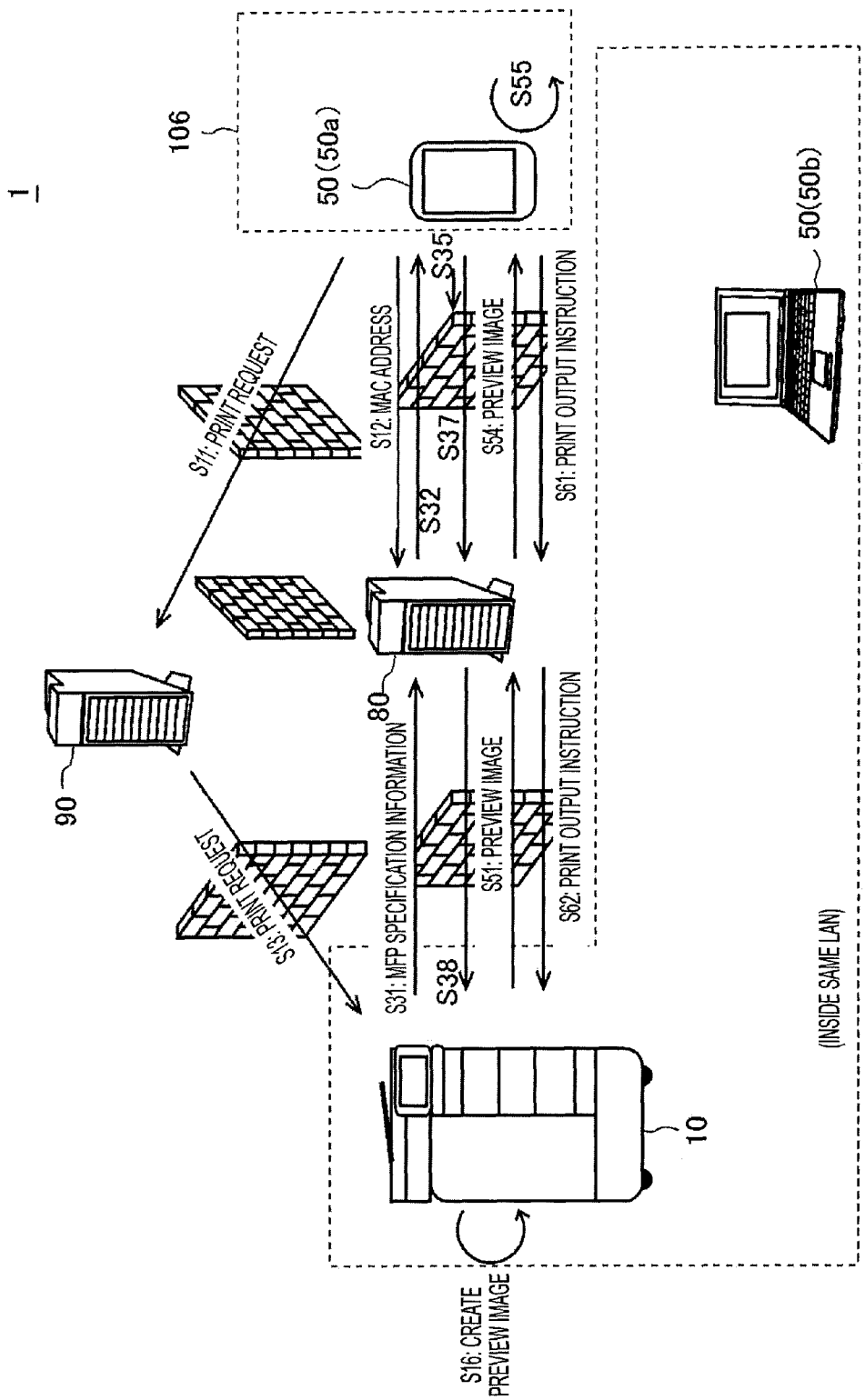
FIG. 14 is a conceptual diagram illustrating an operation of a system according to a third embodiment.
Figure 15:
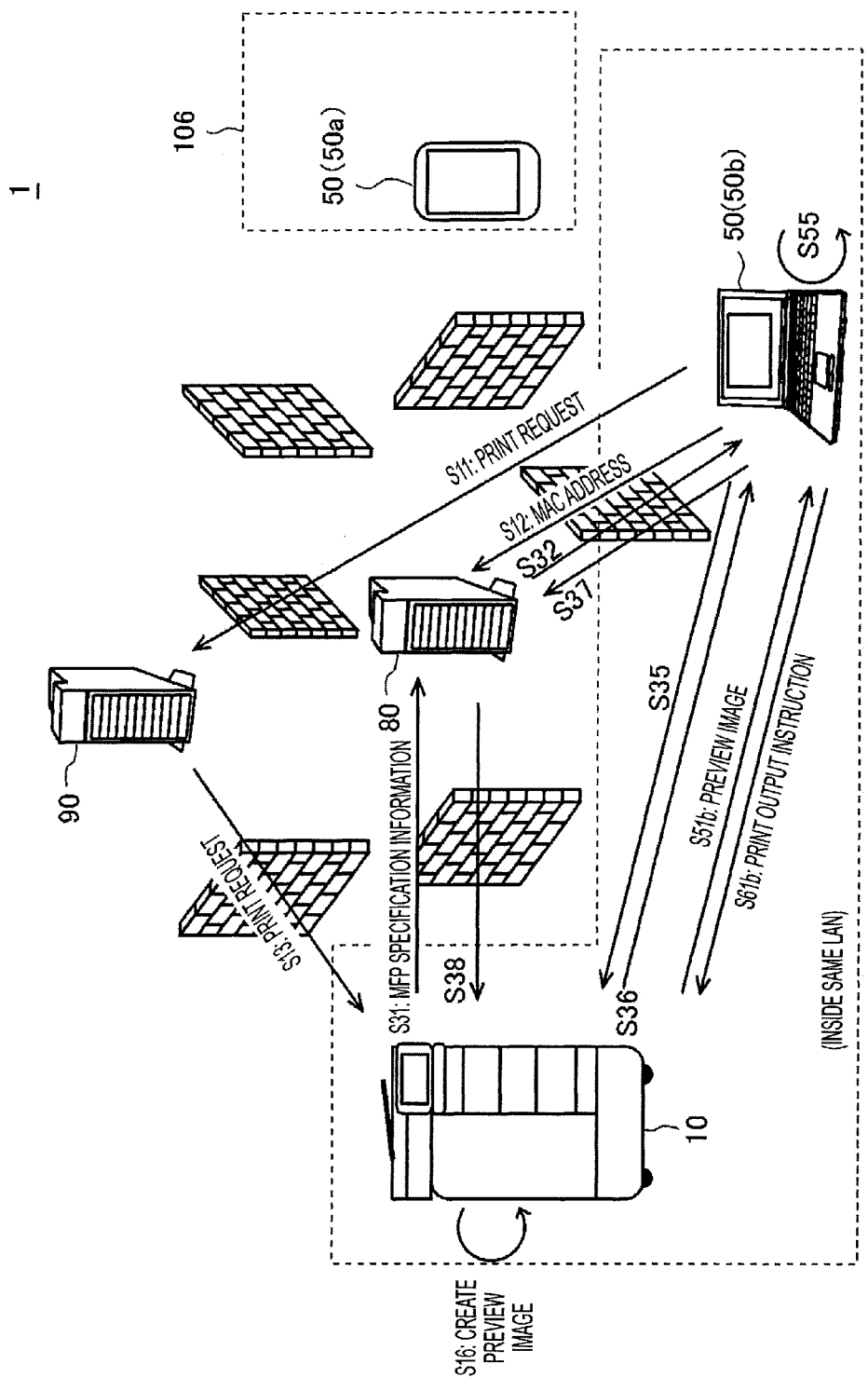
FIG. 15 is a conceptual diagram illustrating an operation of the system according to the third embodiment.
Figure 16:
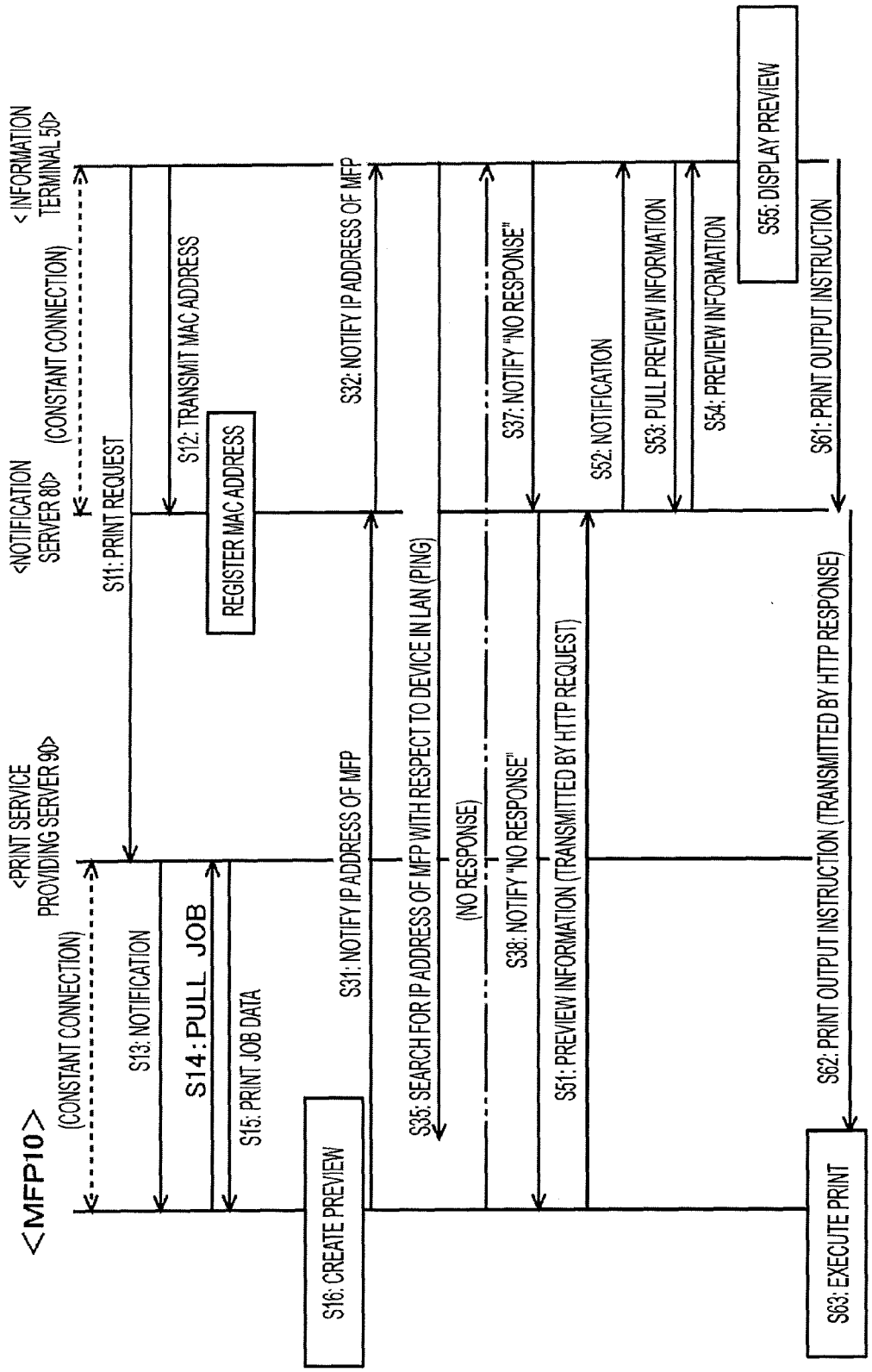
FIG. 16 is a timing chart illustrating an operation example according to the third embodiment.

More specifically, when the information terminal 50 and the MFP 10 belong to different LANs, the display data of the print preview screen 330 is transmitted from the MFP 10 to the information terminal 50 through the server 80 (similarly to first embodiment) (see FIG. 14 and FIG. 16). On the other hand, when the information terminal 50 and the MFP 10 belong to the same LAN 105 (are in same LAN), the display data of the print preview screen 330 is transmitted from the MFP 10 to the information terminal 50 not through the server 80 (see FIG. 15 and FIG. 17). In the following, such a mode will be described in detail.

Figure 17:
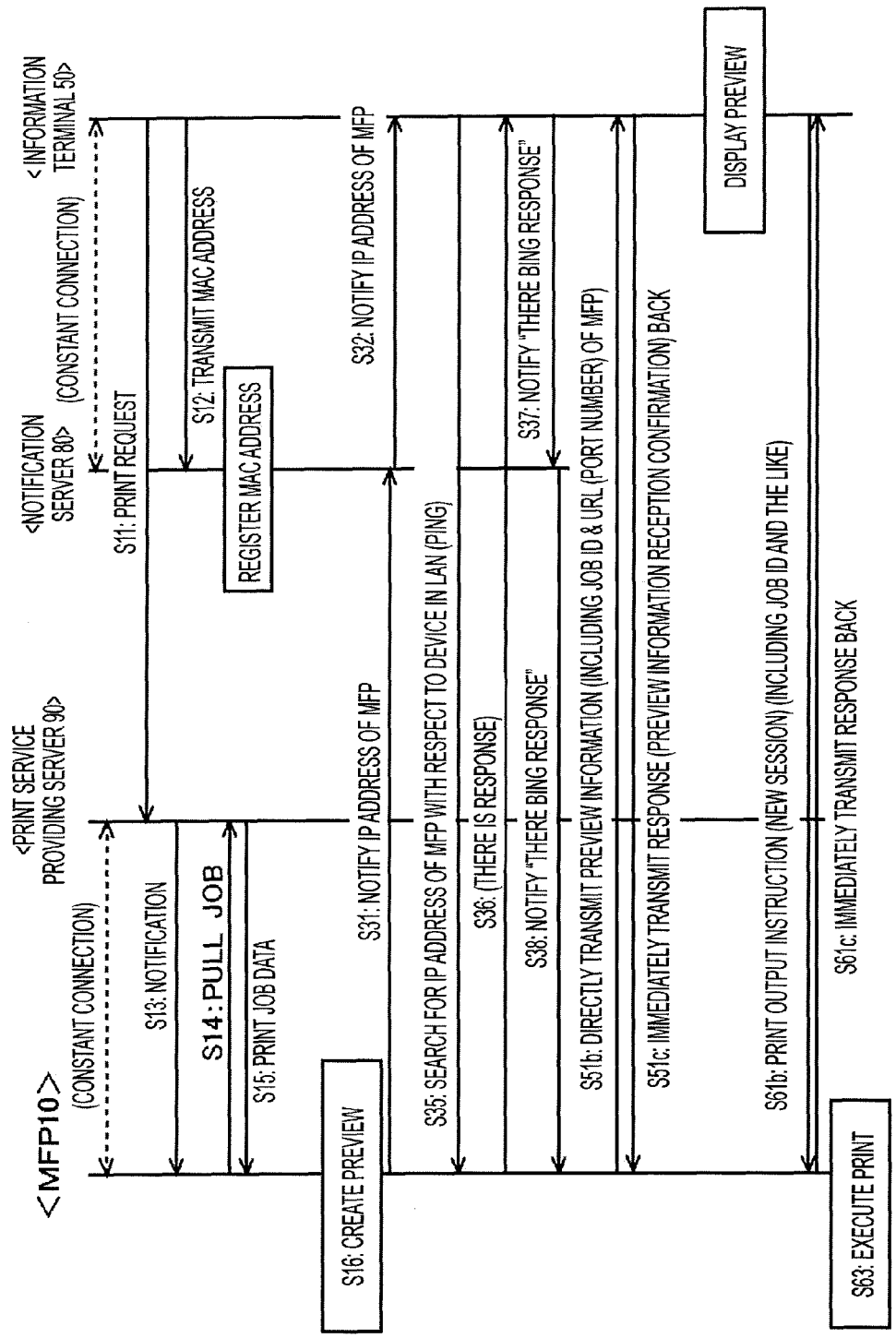
FIG. 17 is a timing chart illustrating an operation example according to the third embodiment.

FIG. 14 and FIG. 15 are conceptual diagrams illustrating operations of a system 1 according to the third embodiment. FIG. 16 and FIG. 17 are timing charts illustrating operation examples according to the third embodiment. In each of FIG. 14 and FIG. 16, an operation of when the information terminal 50 and the MFP 10 belong to different LANs is illustrated. On the other hand, in each of FIG. 15 and FIG. 17, an operation of when the information terminal 50 and the MFP 10 belong to the same LAN is illustrated.

Operations similar to those in the first embodiment are performed in up to step S16.

Then, in step S31 to step S38, processing of determining whether the MFP 10 and the information terminal 50 are in the same LAN 105 is performed.

More specifically, first, the MFP 10 transmits device specification information (such as IP address) to specify the MFP 10 to the information terminal 50 through the server 80 (step S31 and step S32). More specifically, in step S31 (see FIG. 14 to FIG. 17), the MFP 10 notifies an IP address (local IP address) of the MFP 10 itself to the server 80. Then, the server 80 transfers the received "IP address of the MFP 10" to the information terminal 50 (step S32). Here, based on an MAC address (MAC address of information terminal 50) received in step S12, address information (more specifically, MAC address and IP address) of an information terminal 50 which is a source of a print request, that is, a communication destination of communication processing in step S32 is to be specified.

Then, in step S35, based on the IP address (device specification information), the information terminal 50 checks whether there is a device (MFP 10) with the IP address is in the same LAN. For example, the information terminal 50 checks whether the IP address is in the same LAN (105) by using a "PING" command. More specifically, when the "PING" command is transmitted (step S35) and there is a response (step S36 (see FIG. 15 and FIG. 17)), it is determined that the device (MFP 10) corresponding to the IP address is in the same LAN 105. On the other hand, when the "PING" command is transmitted (step S35) and there is no response, it is determined that there is no device (MFP 10) corresponding to the IP address in the LAN 105 (see FIG. 14 and FIG. 16)).

Then, the information terminal 50 transmits each determination result to the MFP 10.

More specifically, when there is no response from the MFP 10, the information terminal 50 notifies a determination result indicating that there is no response (in other words, information terminal 50 and MFP 10 are not in same LAN 105) to the MFP 10 through the server 80 (step S37 and step S38) (see FIG. 14 and FIG. 16). Further, when there is a response from the MFP 10, the information terminal 50 notifies a determination result indicating that there is a response (in other words, information terminal 50 and MFP 10 are in same LAN 105) to the MFP 10 through the server 80 (step S37 and step S38) (see FIG. 15 and FIG. 17). Note that in step S32 and step S37, communication using an XMPP is to be performed and the communication in step S38 is to be executed as an HTTP response which responds to the HTTP request in step S31. Further, in step S38, the IP address or the like of the information terminal 50 in the source of the print request which address or the like is determined in step S32 (or determined based on MAC address (MAC address of information terminal 50) received in step S12) is also transmitted from the server 80 to the MFP 10.

Then, an operation similar to that in the second embodiment is executed.

More specifically, when it is determined that the information terminal 50 and the MFP 10 are not in the same LAN (105), similarly to the first embodiment, the MFP 10 transmits the display data of the print preview screen 330 to the information terminal 50 (50*a*) through the server 80 as illustrated in FIG. 14 and FIG. 16 (step S51 to S54). Further, processing in and after step S55 is performed in a manner similar to that in the first embodiment.

On the other hand, when it is determined that the information terminal 50 and the MFP 10 are in the same LAN (105), the MFP 10 transmits the display data or the like of the print preview screen 330 to the information terminal 50 not through the server 80 as illustrated in FIG. 15 and FIG. 17 (step S51*b*). Further, the information terminal 50 transmits a response back immediately (step S51*c*) and a communication session between the information terminal 50 and the MFP 10 is ended once. Note that as a transmission destination address in step S51*b*, the IP address acquired in step S38 (IP address of information terminal 50 in source of print request) or the like is to be used.

Then, based on the received display data, the information terminal 50 (50*b*) displays the print preview screen 330 onto a display unit 56*b* (step S55).

When a user presses a print button 341 on the print preview screen 330, the information terminal 50 directly transmits a print output instruction to the MFP 10 not through the server 80 (step S61*b*). Further, the MFP 10 immediately transmits a response back (step S61*c*).

Then, when receiving the print output instruction, the MFP 10 executes print output processing (step S63).

With the above described mode, an effect similar to that of the second embodiment can be also acquired.

4. Fourth Embodiment

In each of the above first to third embodiments, a mode in which the spirit of the present invention is applied, for example, to transmission/reception of information related to a print preview screen has been described as an example. However, these are not the limitations. For example, the spirit of the present invention can be also applied to transmission/reception of information related to a print setting screen. In the fourth embodiment, such a mode will be described.

As described above, in each of the above embodiments, a setting item (print setting item) which can be set with respect to the MFP 10 is previously registered in the server 90 and the information terminal 50 can receive a setting operation related to the previously-registered setting item by using the print setting screen 210 transmitted from the server 90 (step S11).

However, since the information terminal 50 receives a setting operation by using the print setting screen 210 transmitted from the server 90, a setting operation related to a setting item other than the setting item previously-registered in the server 90 cannot be received. For example, when a setting item "punch" is not yet registered into the server 90, the information terminal 50 cannot perform a setting operation related to the setting item "punch." Further, even with respect to the previously-registered setting item, setting contents other than previously-registered setting contents cannot be set. For example, when only setting contents the "upper left" are previously registered as a selection candidate (choice) of setting contents with respect to a setting item "stapled position," in a case where setting contents the "upper right" and the like which become possible to be set for the first time by a change in a finisher device (optional device in MFP 10) are not yet registered, the information terminal 50 cannot receive setting of the setting contents the "upper right" and the like.

On the other hand, in the fourth embodiment, an MFP 10 creates display data of a print setting screen 410 for the MFP 10 and the MFP 10 transmits the display data of the print setting screen 410 to an information terminal 50. The print setting screen 410 includes at least one of a print setting item other than a print setting item previously registered in a server 90 and print setting contents other than print setting contents previously registered in the server 90. In other words, the print setting screen 410 is a screen with which a setting item not included in a print setting screen (210) in step S11 and/or setting contents which cannot be set on the print setting screen 210 can be set. With the print setting screen 410, a user can set a setting item other than the setting item previously registered in the server 90 and/or a setting candidate (setting contents) other than a setting candidate previously registered in the server 90.

Figure 18:
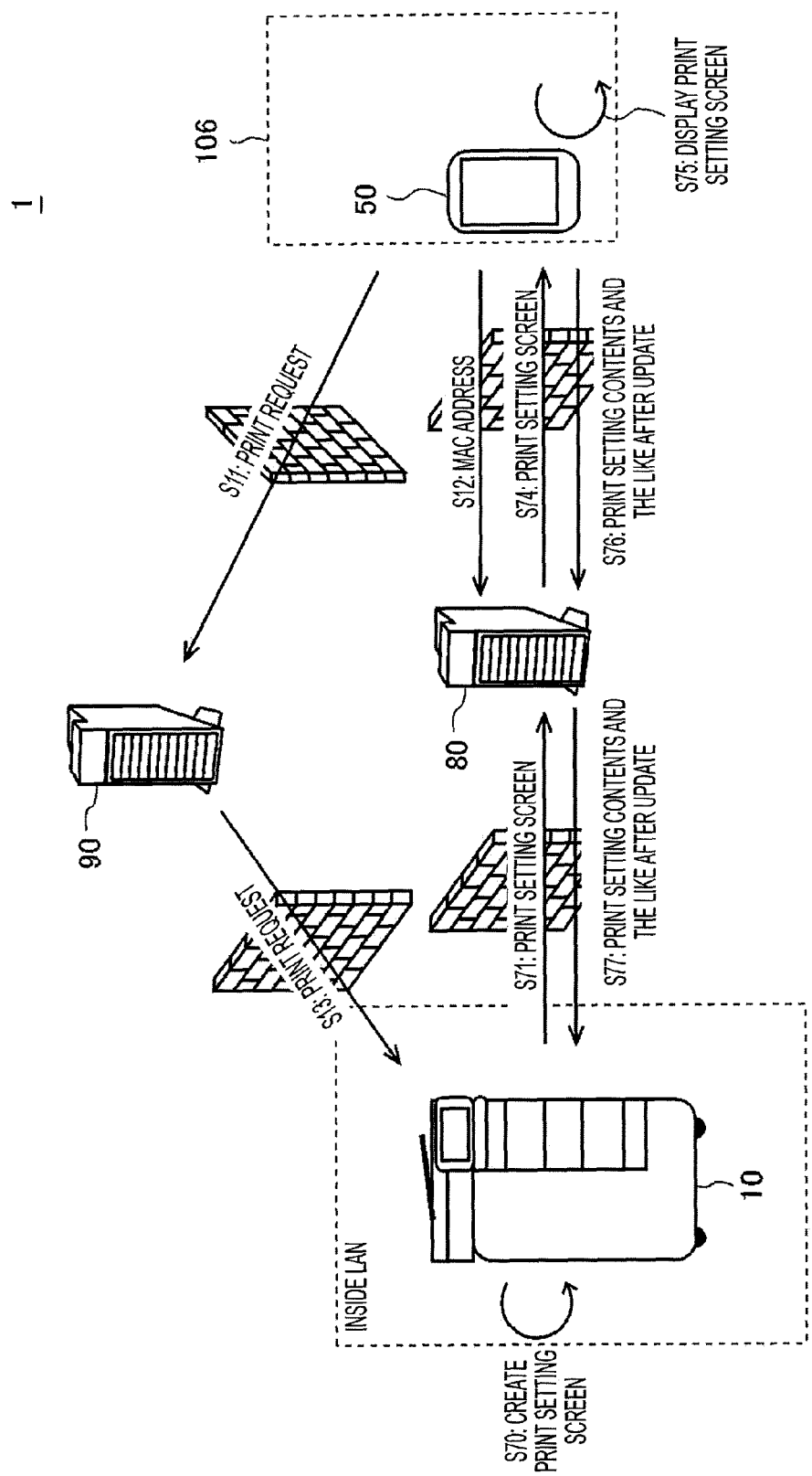
FIG. 18 is a conceptual diagram illustrating an operation in a printing system according to a fourth embodiment.
Figure 19:
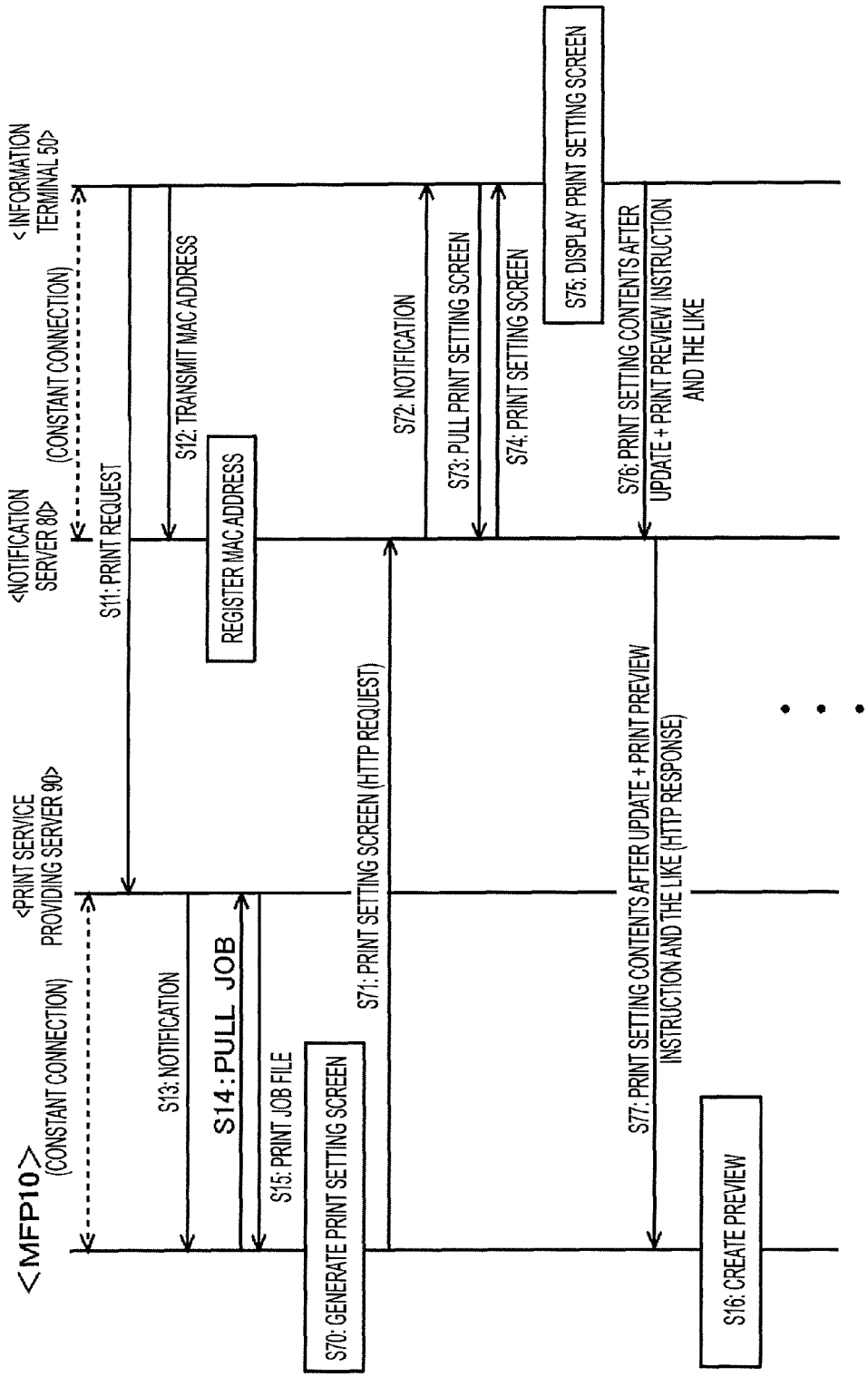
FIG. 19 is a timing chart illustrating an operation example according to the fourth embodiment.

FIG. 18 is a conceptual diagram illustrating an operation in a printing system 1 according to the fourth embodiment and FIG. 19 is a timing chart illustrating an operation example of the system. In the following, with reference to FIG. 18 and FIG. 19, an operation related to the fourth embodiment will be described.

In the fourth embodiment, operations similar to those in the first embodiment are executed in up to step S15.

Then, operations in step S70 to step S77 are executed before operations in and after step S16.

In step S70, the print setting screen 410 (FIG. 20) is generated. The print setting screen 410 includes not only a previously-registered setting item but also a new setting item. For example, when a setting item "punch" is not yet registered in the server 90 and a setting candidate the "upper right" of a setting item "stapled position" is not yet registered in the server 90 at a time point of execution of step S11, the MFP 10 generates, in step S70, display data of a print setting screen 410 (see FIG. 20) which reflects a current (latest) device configuration (step S70). The print setting screen 410 includes the setting item "punch" and a setting candidate thereof (such as "two holes") and also includes the setting item "stapled position" and a new setting candidate thereof (such as "upper right").

Then, similarly to the display data of the print preview screen in each of the above embodiments, the display data of the print setting screen 410 is transmitted from the MFP 10 to the information terminal 50 (step S71 to S74). Note that in processing in each of step S71, step S72, step S73, and step S74, processing similar to that in each of step S51, step S52, step S53, and step S54 (see FIG. 5 and the like) is performed other than a point that data to be transmitted is different (point that display data of print setting screen 410 is transmitted instead of display data of print preview screen 330).

Then, in step S75, based on the display data received in step S74, the information terminal 50 displays the print setting screen 410 onto the display unit 56b.

Figure 20:
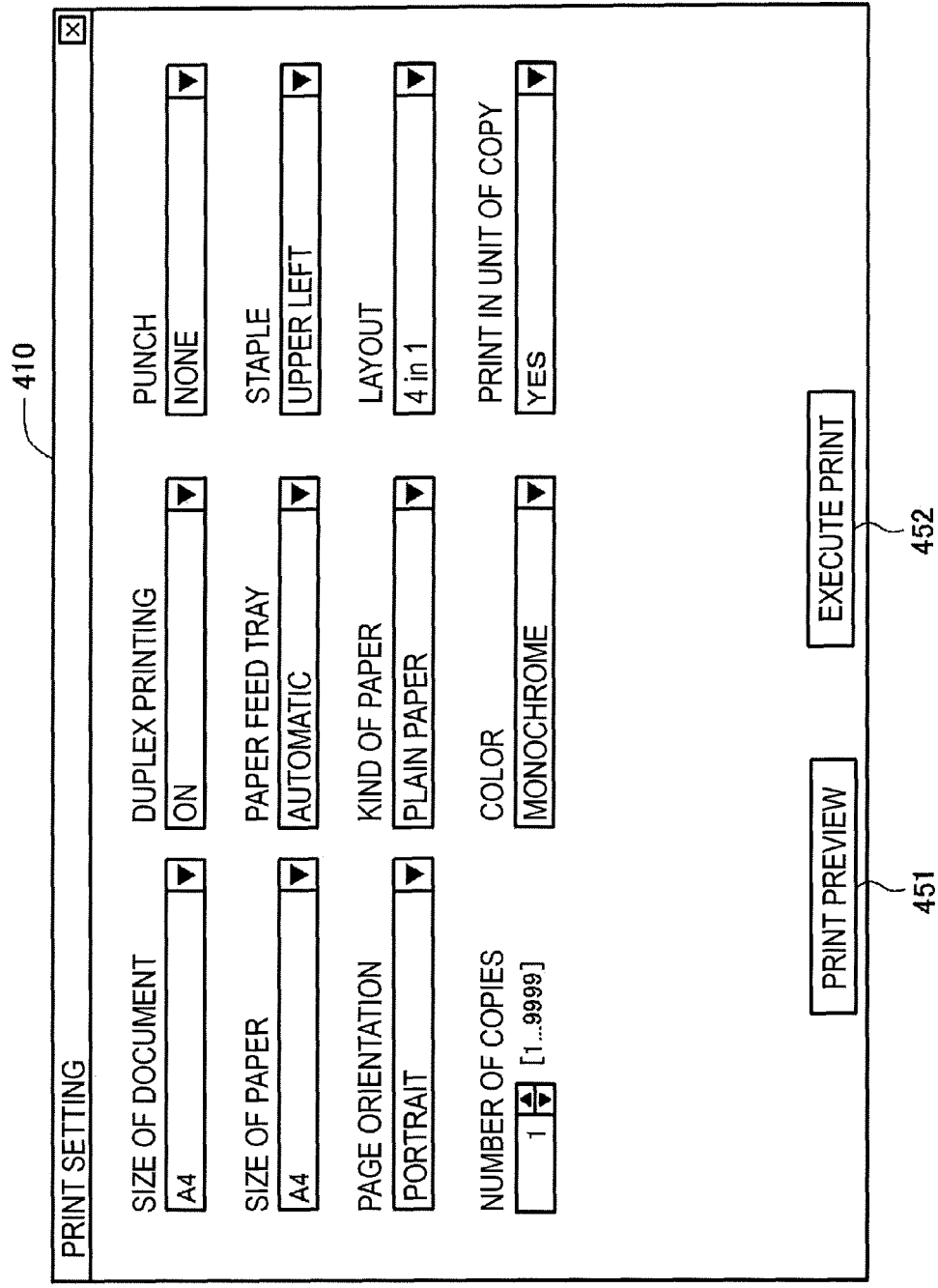
FIG. 20 is a view illustrating a new print setting screen.

FIG. 20 is a view illustrating such a print setting screen 410. Note that at a time point at which a display of the print setting screen 410 is started, a default value ("none") is displayed (set) with respect to an added item "punch" and a value before a change (such as "upper left") is set with respect to a "stapled position." Further, the print setting screen 410 reflects print setting (such as setting contents "portrait" of setting item "page orientation") included in a print request (print job data) received in step S15.

As described above, this print setting screen 410 includes at least one of a print setting item (such as setting item "punch") other than a print setting item previously registered in the server 90 and print setting contents (such as setting contents (setting candidate) "upper right" of setting item "stapled position") other than print setting contents previously registered in the server 90. With the print setting screen 410, a user can set a setting item other than the setting item previously registered in the server 90 and/or a setting candidate (setting contents) other than a setting candidate previously registered in the server 90.

By using the print setting screen 410, the user changes setting contents related to the "punch" and/or the "stapled position" when necessary. For example, it is possible to set "two holes" (or "three holes") as setting contents of the setting item "punch" and/or to change setting contents of the setting item "stapled position" from the "upper left" to the "upper right" or the like. Then, when a print setting change is completed, a user presses a print preview button 451 (or print button 452). When the print preview button 451 is pressed, setting information after the setting change and a print preview instruction are transmitted from the information terminal 50 to the MFP 10 through the server 80 (step S76 and step S77). For example, the information terminal 50 transmits the print preview instruction and the setting information after the setting change (print setting information after update) to the server 80 (step S76) and the server 80 transfers the print preview instruction and the setting information to the MFP 10 (step S77). In step S77, the print preview instruction and the setting information are transmitted as a response (HTTP response) to an HTTP request in step S71.

Further, then, processing similar to that in step S16 and that in and after step S51 in the first embodiment is executed.

According to such processing, display data of the latest print setting screen 410 generated in the MFP 10 is transmitted from the MFP 10 to the information terminal 50. Thus, the information terminal 50 can acquire more various kinds of information flexibly. Further, a user can perform print setting operation by using the latest print setting screen.

Note that in the above-described fourth embodiment, a mode in which a request for transmission of the print preview screen 330 is transmitted, along with the print setting contents after the update, from the information terminal 50 to the MFP 10 after step S75 and an operation similar to that in the first embodiment is performed has been described as an example. However, this is not the limitation. For example, after step S75, a print instruction (print output instruction) may be transmitted, along with the print setting contents after the update, from the information terminal 50 to the MFP 10 in response to pressing of the print button 452.

5. Fifth Embodiment

In the fifth embodiment, a mode in which the spirit of the present invention is applied, for example, to transmission/reception of status information is described as an example.

Figure 21:
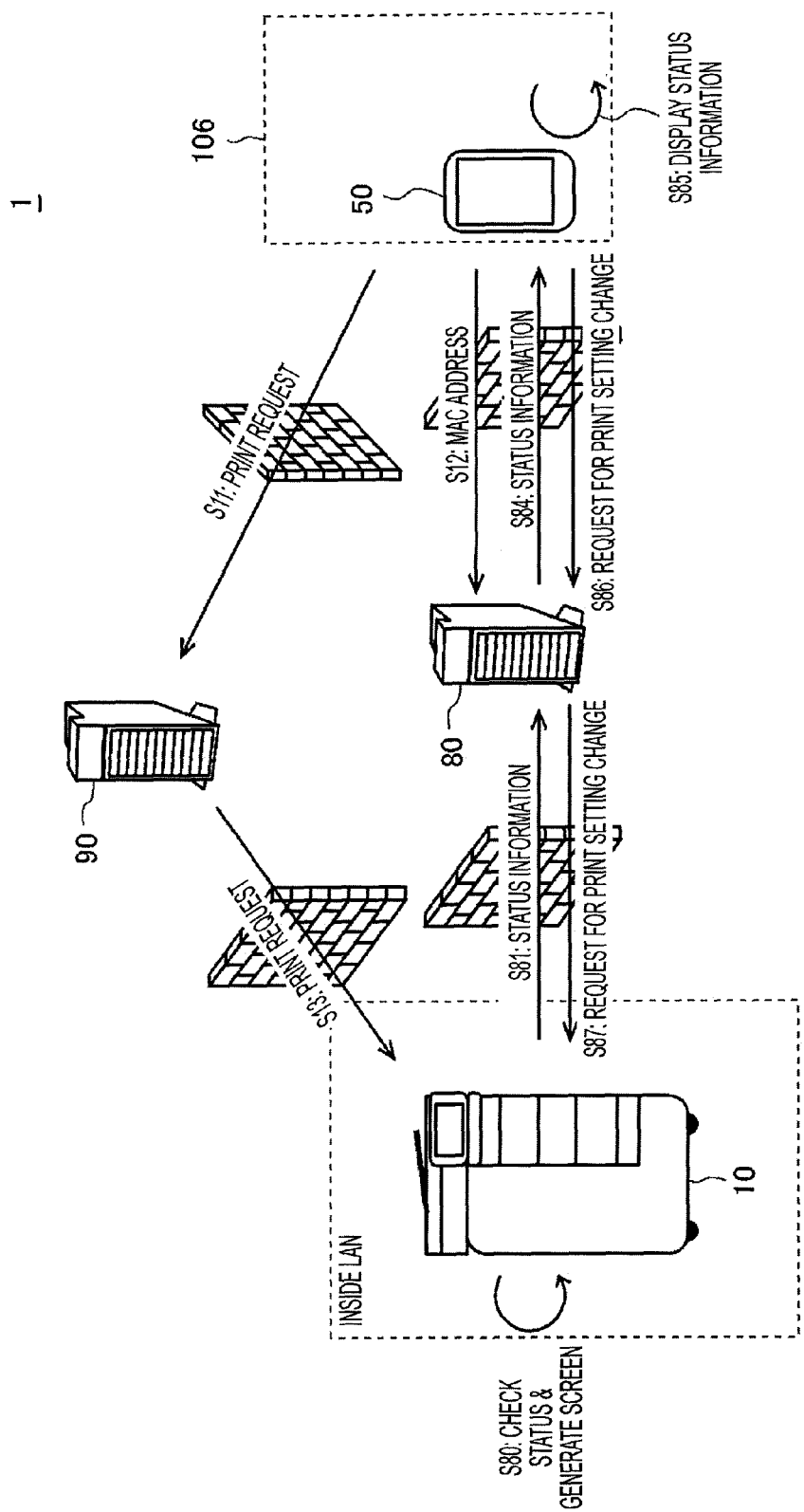
FIG. 21 is a conceptual diagram illustrating an operation in a printing system according to a fifth embodiment.
Figure 22:
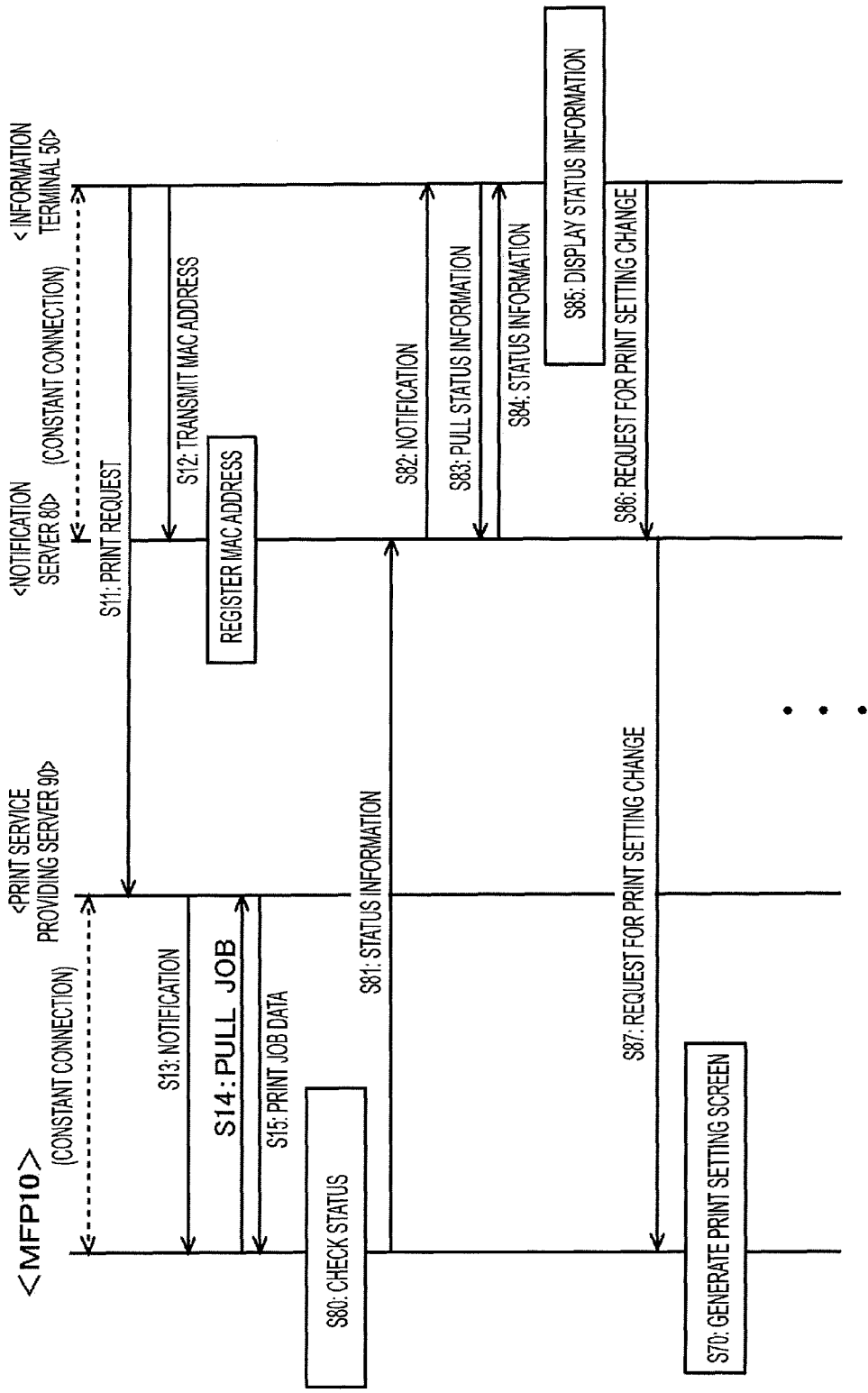
FIG. 22 is a timing chart illustrating an operation example according to the fifth embodiment.

FIG. 21 is a conceptual diagram illustrating an operation in a printing system 1 according to the fifth embodiment and FIG. 22 is a timing chart illustrating an operation example of the system. In the following, with reference to FIG. 21 and FIG. 22, an operation related to the fifth embodiment will be described.

In the fifth embodiment, operations similar to those in the first embodiment are executed in up to step S15.

Next, operations in step S80 to step S87 are executed after a print request is received and before a print output based on the print request is started.

Figure 23:
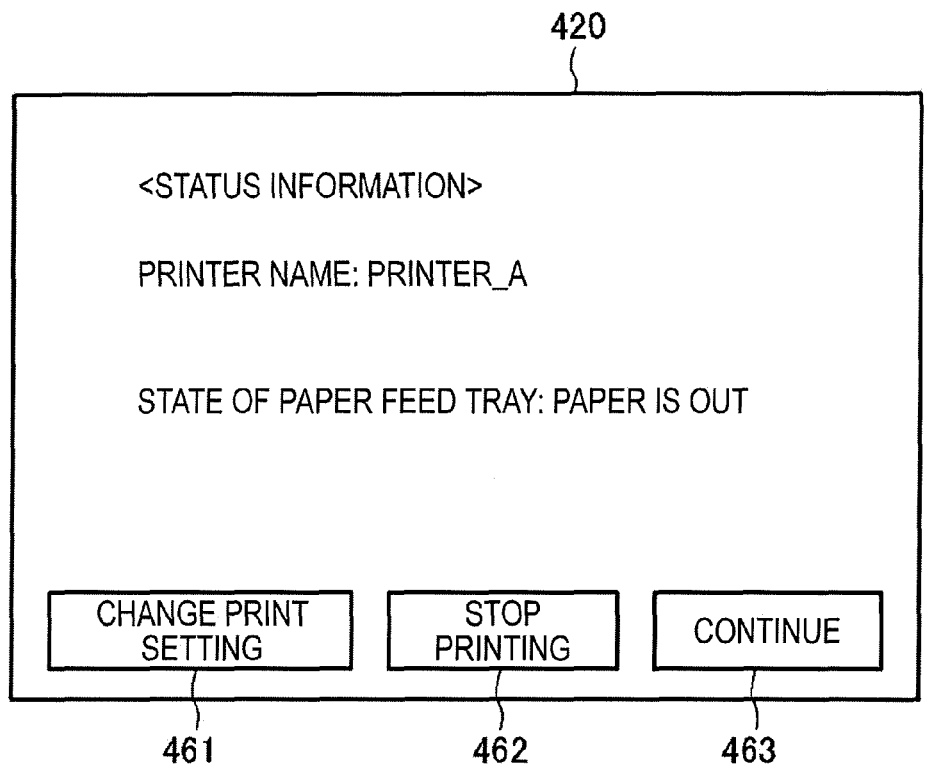
FIG. 23 is a view illustrating a display screen of status information.

In step S80, an MFP 10 acquires a current state (status) of the MFP 10 and generates a display screen 420 (FIG. 23) of status information indicating the state. The status information display screen 420 is a screen indicating the latest state of the MFP 10. For example, the MFP 10 generates a status information display screen 420 indicating a state of "paper being out" (step S80). FIG. 23 is a view illustrating such a status information display screen 420.

Then, similarly to the display data of the print preview screen in each of the above embodiments, display data of the status information display screen 420 is transmitted from the MFP 10 to the information terminal 50 (step S81 to step S84). Note that in processing in each of step S81, step S82, step S83, and step S84, processing similar to that in each of step S51, step S52, step S53, and step S54 (see FIG. 5 and the like) is performed other than a point that data to be transmitted is different (display data of status information display screen 420 is transmitted instead of display data of print preview screen 330).

Then, in step S85, the information terminal 50 displays the status information display screen 420 onto a display unit 56b based on display data received in step S84 (display data generated in step S80 in response to print request transferred from server 90 to MFP 10).

A user uses the status information display screen 420 and changes print setting contents. For example, when a print request designating an "A4" size is made and in a case where a state of "A4" size "paper being out" is found, it is possible to change setting to change a size of paper on which print is performed. Alternatively, the user can cancel the print request to this MFP 10 and can change an MFP 10 to execute the print (assign new print instruction to different MFP).

For example, in a case of changing print setting, the user presses a print setting change button 461 on the status information display screen 420. In response, a print setting change request is transmitted from the information terminal 50 to the MFP 10 through the server 80 (step S86 and step S87). More specifically, the information terminal 50 transmits the print setting change request to the server 80 (step S86) and the server 80 transfers the print setting change request to the MFP 10 (step S87). In step S87, the print setting change request is transmitted as a response (HTTP response) to an HTTP request in step S81.

Then, processing similar to that in and after step S70 in the fourth embodiment is performed.

According to such processing, display data of the latest status information display screen 420 generated in the MFP 10 is transmitted from the MFP 10 to the information terminal 50. Thus, the information terminal 50 can acquire more various kinds of information flexibly. Further, the user can make an appropriate determination by using the latest status information display screen 420.

Note that in the above-described fifth embodiment, the print setting change request is transmitted after step S85 and an operation similar to that in the fourth embodiment is performed. However, this is not the limitation.

For example, after step S85, a print stopping instruction (print cancel instruction) may be transmitted from the information terminal 50 to the MFP 10 in response to pressing on a print stop button 462 and a print output in the MFP 10 may be stopped.

Alternatively, after step S85, a print instruction (print output instruction) may be transmitted from the information terminal 50 to the MFP 10 in response to pressing on a continue button 463 and an operation similar to that in step S61, S62, or the like (see FIG. 5 and the like) may be performed. However, when paper is out, an actual print output is performed after paper is fed to the MFP 10 by a different user.

6. Modification Example and the Like

In the above, embodiments of the present invention have been described. However, the present invention is not limited to the above-described contents.

For example, in the fourth embodiment, when receiving a print request from the information terminal 50, the MFP 10 constantly transmits display data of the print setting screen 410 to the information terminal 50. However, this is not the limitation. For example, the MFP 10 may transmit the display data of the print setting screen 410 to the information terminal 50 only when an update of a finisher device is detected. More specifically, the MFP 10 may compare information, which is previously registered in the server 90 and which can be set, with information which can be currently set (specifically, item and contents which can be set with respect to finisher and the like) and may transmit the print setting screen 410 only when it is determined that there is a difference between the two.

Further, in the fourth embodiment, the operations in step S80 to step S87 are executed before a print output based on a print request is executed. However, this is not the limitation. For example, operations in step S80 to step S87 may be executed after the print output based on the print request is started (and before print output is completed).

Further, the fourth embodiment has been mainly described as a modification example of the first embodiment. However, this is not the limitation. With respect to transmission/reception of the display data of the print setting screen, a modification similar to that in the second embodiment and that in the third embodiment can be made.

Further, in the fifth embodiment, when receiving a print request from the information terminal 50, the MFP 10 constantly transmits display data of the status information display screen 420 to the information terminal 50. However, this is not the limitation. For example, the MFP 10 may transmit the display data of the status information display screen 420 to the information terminal 50 only when a status is abnormal in the own device.

Further, in the fifth embodiment, a status information display screen which only displays the status information is displayed. However, this is not the limitation. For example, a status display screen (print preview screen) including both of a print preview image and status information may be displayed. More specifically, status information may be also displayed on a print preview screen 330 similar to that of the first embodiment. Alternatively, a status display screen (print setting screen) including both of new contents which can be set and status information may be displayed. More specifically, status information may be also displayed on a print setting screen 410 similar to that of the fourth embodiment.

Further, the fifth embodiment has been mainly described as a modification example of the first embodiment. However, this is not the limitation. With respect to transmission/reception of the display data of the status information display screen 420, a modification similar to that in the second embodiment and that in the third embodiment can be made.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A printing system comprising:
   a print output device arranged inside a predetermined LAN, the print output device being configured to print a print job, and the print output device including print setting contents;
   a first server arranged outside the predetermined LAN;
   a second server configured to store specification information to specify a source of transmission of the print request; and
   an information terminal configured to transmit, to the first server, a print request indicating that a print output related to a designated file is to be performed in the print output device, wherein
   the first server transfers the print request to the print output device when receiving the print request from the information terminal,
   the print output device generates display data of a print preview screen based on print settings included in the print request received from the first server and based on the print setting contents of the print output device, and the print output device transmits the display data to the information terminal so that the information terminal receives the display data,
   the information terminal receives, through the second server, device specification information to specify the print output device, the print output device having transmitted device specification information to specify the print output device to the information terminal through the second server,
   the information terminal determines whether the print output device and the information terminal are in the same LAN based on the device specification information received from the print output device through the second server,
   the determination by the information terminal including:
      notifying, when a first determination result indicating that the print output device and the information terminal are not in the same LAN is acquired, the first determination result to the print output device, and
      notifying, when a second determination result indicating that the print output device and the information terminal are in the same LAN is acquired, the second determination result to the print output device, and
   the information terminal receiving the display data of the print preview screen further including:
      receiving the display data from the print output device through the second server when the first determination result is acquired, and
      receiving the display data from the print output device not through the second server when the second determination result is acquired.

2. The printing system according to claim 1,
   wherein the information terminal transmits the print request to the first server and transmits identification information of the information terminal, which is the source of transmission of the print request, to the second server as the specification information.

3. The printing system according to claim 2, wherein
   the second server specifies the information terminal which is the source of transmission of the print request based on the specification information and transmits the display data to the information terminal.

4. The printing system according to claim 3, wherein the second server establishes constant connection with the information terminal by a message session by a predetermined protocol and transmits a request for receiving the display data to the information terminal from the second server by using the message session, and
   the information terminal receives the display data from the second server in response to the request for receiving the display data.

5. The printing system according to claim 4, wherein the print output device transmits the display data to the second server as an HTTP request to the second server,
   the information terminal displays the print preview screen based on the display data transmitted through the second server, and
   when receiving, from the information terminal, a print output instruction which is based on an operation instruction from a user who checks the print preview screen, the second server transmits the print output instruction to the print output device as an HTTP response to the HTTP request.

6. The printing system according to claim 2, wherein the print output device determines whether the information terminal is in the predetermined LAN,
   transmits the display data to the information terminal through the second server when it is determined that the information terminal is not in the predetermined LAN, and
   transmits the display data to the information terminal not through the second server when it is determined that the information terminal is in the predetermined LAN.

7. A non-transitory recording medium storing a computer readable program causing a computer, which is included in an information terminal, to execute
   a) a step of transmitting, to a first server arranged outside a predetermined LAN, a print request indicating that a print output related to a designated file is to be performed in a print output device arranged inside the predetermined LAN, and
   b) a step of receiving display data of a print preview screen which data is generated by the print output device based on print settings included in the print request transferred from the first server to the print output device and based on display data of status information of the print output device,
c) a step of receiving, through a second server, device specification information to specify the print output device, and
d) a step of determining whether the print output device and the information terminal are in the same LAN based on the device specification information, wherein the step d) includes d-1) a step of notifying, when a first determination result indicating that the print output device and the information terminal are not in the same LAN is acquired, the first determination result to the print output device, and d-2) a step of notifying, when a second determination result indicating that the print output device and the information terminal are in the same LAN is acquired, the second determination result to the print output device, and the step b) includes b-1) a step of receiving the display data from the print output device through the second server when the first determination result is acquired, and b-2) a step of receiving the display data from the print output device not through the second server when the second determination result is acquired.

8. The non-transitory computer readable medium according to claim 7, wherein the computer readable program causes the computer in the information terminal to transmit the print request to the first server and to transmit identification information of the information terminal, which is the source of transmission of the print request, to the second server as the specification information.

* * * * *